(12) United States Patent
Sato et al.

(10) Patent No.: US 8,834,826 B2
(45) Date of Patent: Sep. 16, 2014

(54) AGGREGATE OF CARBON NANOTUBES, DISPERSION THEREOF AND CONDUCTIVE FILM USING THE SAME

(75) Inventors: Kenichi Sato, Nagoya (JP); Masahito Yoshikawa, Nagoya (JP); Naoyo Okamoto, Nagoya (JP); Shuko Numata, Nagoya (JP)

(73) Assignee: TORAY Industries, Inc., Tokyo (JP)

( * ) Notice: Subject to any disclaimer, the term of this patent is extended or adjusted under 35 U.S.C. 154(b) by 629 days.

(21) Appl. No.: 12/215,405

(22) Filed: Jun. 27, 2008

(65) Prior Publication Data

US 2009/0001326 A1    Jan. 1, 2009

(30) Foreign Application Priority Data

Jun. 29, 2007    (JP) .................................. 2007-173563

(51) Int. Cl.

| | |
|---|---|
| *D01F 9/12* | (2006.01) |
| *C08J 7/06* | (2006.01) |
| *C09D 7/12* | (2006.01) |
| *C08J 7/04* | (2006.01) |
| *B82Y 30/00* | (2011.01) |
| *H01B 1/12* | (2006.01) |
| *C09D 5/24* | (2006.01) |
| *B82Y 40/00* | (2011.01) |
| *C01B 31/02* | (2006.01) |
| *H01B 1/04* | (2006.01) |
| *H01J 1/304* | (2006.01) |
| *H01B 1/24* | (2006.01) |
| *C08K 3/04* | (2006.01) |

(52) U.S. Cl.
CPC ... *D01F 9/12* (2013.01); *C08J 7/06* (2013.01); *C09D 7/1291* (2013.01); *C08J 7/047* (2013.01); *C08J 2400/12* (2013.01); *B82Y 30/00* (2013.01); *H01B 1/128* (2013.01); *C01B 2202/06* (2013.01); *C01B 2202/28* (2013.01); *C09D 5/24* (2013.01); *B82Y 40/00* (2013.01); *C01B 31/0273* (2013.01); *H01B 1/04* (2013.01); *C08J 2367/02* (2013.01); *H01J 2201/30469* (2013.01); *H01J 1/304* (2013.01); *C08K 3/04* (2013.01); *H01B 1/24* (2013.01)
USPC .................. 423/447.2; 423/447.1; 423/447.3; 252/500

(58) Field of Classification Search
USPC ........ 423/447.1, 447.2, 445 B; 977/734, 742, 977/750, 752
See application file for complete search history.

(56) References Cited

U.S. PATENT DOCUMENTS 7,419,650 B2 *  9/2008  Pierard et al. .............. 423/447.1
7,485,600 B2 *  2/2009  Harutyunyan et al. ....... 502/336

(Continued)

FOREIGN PATENT DOCUMENTS

JP      2005-343726        12/2005
WO    WO/2007/078005 A1 *  7/2007
WO    WO 2008/054473 A2 *  5/2008

OTHER PUBLICATIONS

Zhao et al., "Raman Spectra and X-Ray Diffraction Patterns of Carbon Nanotubes Prepared by Hydrogen Arc Discharge," 1998, Jpn. J. Appl. Phys., vol. 37, pp. 4846-4849.*

(Continued)

*Primary Examiner* — Daniel C McCracken
(74) *Attorney, Agent, or Firm* — Kubovcik & Kubovcik

(57) ABSTRACT

Provided is an aggregate of carbon nanotubes satisfying (1) there is a 2θ peak at 24°±2° by X-ray powder diffraction analysis; (2) a height ratio (G/D ratio) of G band to D band by Raman spectroscopic analysis of wavelength 532 nm is 30 or more; and (3) a combustion peak temperature is from 550° C. to 700° C. The present invention provides an aggregate of carbon nanotubes excellent in dispersibility while high quality, giving a film, molded article, membrane or the like having excellent characteristics.

13 Claims, 4 Drawing Sheets

(56) References Cited

U.S. PATENT DOCUMENTS

| | | | |
|---|---|---|---|
| 7,704,482 B2* | 4/2010 | Sato et al. | 423/447.3 |
| 7,719,265 B2* | 5/2010 | Harutyunyan et al. | 324/239 |
| 7,736,741 B2* | 6/2010 | Maruyama et al. | 428/408 |
| 2004/0028599 A1* | 2/2004 | Pierard et al. | 423/447.1 |
| 2006/0104889 A1* | 5/2006 | Harutyunyan et al. | 423/447.3 |
| 2006/0104890 A1* | 5/2006 | Harutyunyan et al. | 423/447.3 |
| 2007/0116629 A1* | 5/2007 | Harutyunyan et al. | 423/447.3 |
| 2008/0102017 A1* | 5/2008 | Maruyama et al. | 423/414 |
| 2008/0145300 A1* | 6/2008 | Keller et al. | 423/447.1 |
| 2008/0290007 A1* | 11/2008 | Fagan et al. | 209/659 |
| 2009/0022652 A1* | 1/2009 | Sato et al. | 423/447.2 |
| 2009/0142581 A1* | 6/2009 | Heintz et al. | 428/323 |
| 2009/0272935 A1* | 11/2009 | Hata et al. | 252/70 |
| 2009/0274609 A1* | 11/2009 | Harutyunyan et al. | 423/445 B |
| 2009/0324484 A1* | 12/2009 | Harutyunyan et al. | 423/447.3 |
| 2010/0119436 A1* | 5/2010 | Takimoto et al. | 423/447.2 |

OTHER PUBLICATIONS

Rinzler et al., "Large-scale purification of single-wall carbon nanotubes: process, product, and characterization," 1998, Appl. Phys. A, 67, pp. 29-37.*

Cao et al., "X-ray diffraction characterization on the alignment degree of carbon nanotubes," 2001, Chemical Physics Letters, 344, pp. 13-17.*

M. Endo, et al., "Buckypaper' from coaxial nanotubes" Nature, vol. 433, 2005, p. 476.

H. Muramatsu, et al., "Pore structure and oxidation stability of double-walled carbon nanotube-derived bucky paper" Chemical Physics Letters, vol. 414, 2005, pp. 444-448.

Junichi Miyamoto et al., "Efficient H2 Adsorption by Nnopores of High-Purity Double-Walled Carbon" J. Am. Chem. Soc., vol. 128, 2006, pp. 12636-12637.

* cited by examiner

AGGREGATE OF CARBON NANOTUBES, DISPERSION THEREOF AND CONDUCTIVE FILM USING THE SAME

BACKGROUND OF THE INVENTION

1. Field of the Invention

The present invention relates to an aggregate of carbon nanotubes. Further specifically, it relates to an aggregate of carbon nanotubes and a dispersion thereof, a transparent conductive film, and a field emission material.

2. Description of the Related Art

In 1991, carbon nanotubes were widely reported for the first time. A carbon nanotube has a tubular shape that substantially one face of graphite is wound, one wound in one layer is called a single-walled carbon nanotube, and one wound in multilayer is called a multi-walled carbon nanotube. Among multi-walled carbon nanotubes, in particular, one wound in two layers is called a double-walled carbon nanotube. Carbon nanotubes are expected to be used as a conductive material having excellent intrinsic electrical conductivity by themselves.

As a method for producing carbon nanotubes, an arc discharge method, laser evaporation method, chemical vapor deposition method and the like are known. Of the chemical vapor deposition methods, there is known a catalyst chemical vapor deposition method which is conducted by supporting a catalyst on a support.

Among carbon nanotubes, it is known that a single-walled carbon nanotube is high in characteristics such as electrical conductivity and heat conductivity because it has a high graphite structure. However, since the single-walled carbon nanotube has a strong and very thick bundle structure, it cannot exhibit a nano-effect that each carbon nanotube possesses, and it has been difficult to develop various applications thereof. In particular, since the dispersion in a resin or solvent is difficult, its expected high characteristic cannot be exhibited, and the present situation is that the development of various applications has been hindered. In particular, it has been difficult to exhibit a practical performance in applications as a transparent conductive film, molded article, membrane or the like using the carbon nanotube Of multi-walled carbon nanotubes, carbon nanotubes with relatively a few number of layers, 2 to 5 layers, have both characteristics of those of single-walled carbon nanotube and multi-walled carbon nanotube, thus there have been drawn attentions as a promising material in various applications. Above all, it is thought that a double-walled carbon nanotube has the most excellent characteristic, and several synthesis methods have been developed. Recently, as a synthesis method of double-walled carbon nanotubes with high purity, a method of Endo et al. is known (Japanese Unexamined Patent Publication No. 2005-343726; Nature, vol. 433, 476 (2005), Chemical Physics Letters, 414 (2005) 444-448; Journal of American Chemical Society, 128 (2006) 12636-12637). In this method, a carbon source is reacted by disposing an iron salt as a main catalyst and molybdate as a co-catalyst to synthesize a double-walled carbon nanotube. Further, as an application for the double-walled carbon nanotube thus obtained, since a double-walled carbon nanotube has high heat stability, an application as a field emitter used in a high electric current is described.

However, a double-walled carbon nanotube with high quality forms, in the same manner as a single-walled carbon nanotube, a strong bundle through a hydrophobic interaction between tubes and interaction between pi-electrons, and it has been thought to be difficult to disperse the carbon nanotube. It is thought that a double-walled carbon nanotube according to Endo et al. forms similarly a strong and thick bundle. As the indirect evidence for having a strong and thick bundle structure, heat stability of aggregate of carbon nanotubes is mentioned. It is assumed that an aggregate of carbon nanotubes with high heat stability forms a thicker bundle structure (Non-patent document 3). The heat stability of carbon nanotubes can be determined by combustion peak temperature in air. Combustion in air is thought to be an oxidation reaction by attack of oxygen molecules. Even if each is the same carbon nanotube, a bundle thereof is thick, namely, in a bundle that more carbon nanotubes get together, inner carbon nanotubes hardly undergo the attack of oxygen, thus oxidation reaction hardly occurs, and the combustion peak temperature of aggregate of carbon nanotubes rises. Reversely, when a bundle is thin, namely, in a bundle that a few carbon nanotubes get together, it is thought that inner carbon nanotubes also easily undergo the attack of oxygen, thus the combustion peak temperature of aggregate of carbon nanotubes is lowered.

Carbon nanotubes described in the foregoing documents are those produced in the same synthesis method, as described in Journal of American Chemical Society, the combustion peak temperature is as high as 717° C., it is thought that these carbon nanotubes form a strong and thick bundle, and they were not sufficient in the case where dispersibility of high level was required.

On the other hand, regarding multi-walled carbon nanotubes with more numbers of layers than those described above, generally the diameter is large, there are many defects in the graphite layer, because it is more difficult to form a bundle than the above-described carbon nanotubes with a few number of layers, dispersibility is superior. However, since such multi-walled carbon nanotubes are inferior in quality, it has been difficult to exhibit practical performance in applications as a transparent conductive film, molded article, membrane or the like requiring particularly excellent light transmittance and surface resistance.

SUMMARY OF THE INVENTION

The present invention has been done in view of the above-described situations, it is an object to provide an aggregate of carbon nanotubes capable of exhibiting inherent characteristics of carbon nanotube such as better dispersibility while high quality than conventional one, having excellent light transmittance and surface resistance.

The present inventors have keenly studied, as a result, found that an aggregate of carbon nanotubes being multilayer and a thin bundle while high quality can give an aggregate with good dispersibility exhibiting inherent characteristics of carbon nanotube, and achieved the present invention. Further, they have also found that a dispersion with good dispersibility is obtained by using this aggregate of carbon nanotubes as a dispersion. Multi-walled carbon nanotubes have relatively good dispersibility, but the quality (degree of graphitization) is generally bad, the present invention features excellent dispersibility because of being multilayer and thin bundle while a high-quality aggregate of carbon nanotubes. They have found that by using the dispersion of this aggregate of carbon nanotubes, a conductive film with high electrical conductivity and excellent transparency is very easily obtained, and an emission material with a good electron emission characteristic is obtained, which led to the present invention.

Namely, the present invention is an aggregate of carbon nanotubes satisfying the following conditions (1) to (3):

(1) there is a 2θ peak at 24°±2° by X-ray powder diffraction analysis;

(2) a height ratio (G/D ratio) of G band to D band by Raman spectroscopic analysis of wavelength 532 nm is 30 or more; and (3) a combustion peak temperature is 550° C. or more, and 700° C. or less.

Further, the present invention includes a dispersion where the aggregate of carbon nanotubes is dispersed in a dispersant.

Further, the present invention includes a conductive film where a conductive layer containing the aggregate of carbon nanotubes is formed on a substrate.

Further, the present invention includes a field emission material using the aggregate of carbon nanotubes.

Further, the present invention includes a method for producing an aggregate of carbon nanotubes, comprising: a step that in a vertical fluid reactor, a fluid bed is formed by a powdery catalyst supporting iron on magnesia over the whole area in a horizontal cross section direction of the reactor, by flowing methane in a vertical direction inside the reactor, methane is contacted with the catalyst at 500 to 1200° C. to produce an aggregate of carbon nanotubes, and a step that the aggregate of carbon nanotubes obtained is subjected to oxidation treatment in a gas phase, then further subjected to oxidation treatment in a liquid phase.

Figures 1A, 1B, 1C:
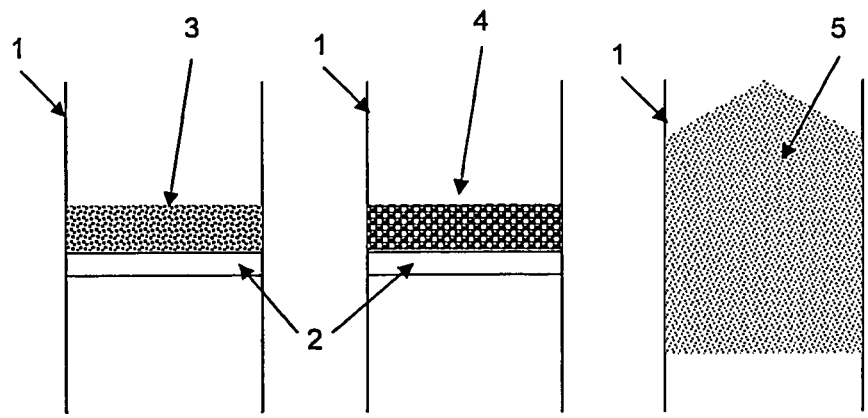
FIG. 1 shows a state that catalysts are present uniformly-on a cross section of reaction tube.

| DESCRIPTION OF NUMBER AND SYMBOL | |
|---|---|
| 1 | Reactor |
| 2 | Table to place catalyst |
| 3 | Catalyst |
| 4 | Mixture of catalyst and substance other than catalyst |
| 5 | Catalyst |
| 100 | Reactor |
| 101 | Quartz sintered plate |
| 102 | Sealed feeder of catalyst |
| 103 | Catalyst input line |
| 104 | Raw gas supply line |
| 105 | Waste gas line |
| 106 | Heater |
| 107 | Inspection port |
| 108 | Catalyst |

DESCRIPTION OF THE PREFERRED EXAMPLES

The present invention is an aggregate of carbon nanotubes satisfying the following conditions (1) to (3):

(1) there is a 2θ peak at 24°±2° by X-ray powder diffraction analysis;

(2) a height ratio (G/D ratio) of G band to D band by Raman spectroscopic analysis of wavelength 532 nm is 30 or more; and (3) a combustion peak temperature is 550° C. or more, and 700° C. or less.

A carbon nanotube has a tubular shape that one face of graphite is wound, one wound in one layer is called a single-walled carbon nanotube, one wound in two layers is called a double-walled carbon nanotube, and one wound in multilayer is called a multi-walled carbon nanotube. The aggregate of carbon nanotubes of the present invention is an aggregate containing a multi-walled carbon nanotube. Further, it is preferable to be high quality and small bundle diameter.

The aggregate of carbon nanotubes in the present invention means an integral (aggregate) that a plurality of carbon nanotubes exist, its existence form is not particularly limited, it may be each mutually independent, a form such as bundle and entanglement, or a mixed form thereof. Further, various numbers of layers and diameters may be included. Further, even in the case of being contained in a composition that a dispersion liquid and other component are compounded or in a composite conjugated with other component, when a plurality of carbon nanotubes are contained, regarding the plurality of these carbon nanotubes, it is interpreted as that an aggregate of carbon nanotubes is contained. Further, although impurities derived from a production method of carbon nanotube (for example, catalyst) may be contained, substantially, it represents one consisting of carbon.

To determine a multilayer structure of aggregate of carbon nanotubes, X-ray powder diffraction analysis (XRD) is carried out: Aggregates of carbon nanotubes are filled in a given sample holder for the surface to be flat, which is set to XRD measuring equipment, and measured by changing irradiation angles of X-ray source from 1.5° to 80° for example. As the X-ray source, for example, CuKα ray is used. The step width is 0.010°, and measuring time is 1.0 seconds. In this case, reading 2θ showing a peak can evaluate aggregates of carbon nanotubes. For graphite, a peak is ordinarily detected around 26° in 2θ, and it is known that this is a peak resulting from interlayer diffraction. Since multi-walled carbon nanotubes have also a graphite structure, a peak by interlayer diffraction of graphite is detected around that position. However, since in carbon nanotubes, graphite is of tubular structure, the value differs from that of graphite. The 2θ value is 24°±2°, there can be assessed that, from appearance of peak in this position, it is not a single layer, but contains an aggregate having a multi-layer structure. Since the peak appearing in this position is a peak by interlayer diffraction of multilayer structure, it becomes possible to determine the number of layers of carbon nanotube. A single-walled carbon nanotube has only one in the number of layers, so that for only single-walled carbon nanotube, no peak appears at a position of 24°±2°. However, even if almost all are single-walled carbon nanotubes, in the case where multi-walled carbon nanotubes are mixed, there is a case that a peak appears at a position of 24°±2° in 2θ.

The aggregate of carbon nanotubes of the present invention contains multi-walled carbon nanotubes to the extent that a peak appears at a position of 24°±2° in 2θ.

As described above, the aggregate of carbon nanotubes of the present invention contains multilayer, but the number of layers is preferably small. Generally, the smaller the number of layers of carbon nanotube is, the better are electrical conductivity and light transmittance, when a film product is formed by using it, there is a merit that a conductive network can be efficiently formed. Further, similarly, in the case where the number of carbon nanotubes is small and particularly double-walled one is more contained, an electron emission characteristic is excellent, and when applied to a field emission material, it is preferable because electron emission becomes possible at low voltage.

The number of layers of carbon nanotube can be evaluated by half breadth of a peak at 24°±2° detected by the above-described XRD measurement. It is thought that the smaller Full-width at half maximum of this peak is, the more the number of layers of carbon nanotube is. It is thought that reversely, the larger Full-width at half maximum of this peak, the fewer the number of layers of carbon nanotube is. In the case where the number of layers of carbon nanotube is large, it is assumed that diffraction intensity becomes high due to diffraction in many layers, thus the peak becomes sharp and half breadth of the peak becomes small. Reversely, in the case where the number of layers of carbon nanotube is small, it is assumed that diffraction intensity becomes broad due to diffraction in few layers. In the present invention, it is preferable that there is a peak at a position of 24°±2° in 2θ and also half breadth of the peak is 5.0° to 6.5°. When Full-width at half maximum of the peak is in this range, the number of layers of carbon nanotube is small while containing multi-walled carbon nanotubes, in particular, an aggregate containing many double-walled carbon nanotubes is indicated.

The quality of aggregate of carbon nanotubes can be evaluated by a Raman spectroscopic analysis method. There are various wavelengths used in a Raman spectroscopic analysis method, herein, 532 nm is utilized. In a Raman spectrum, Raman shift observed around 1590 cm$^{-1}$ is called G band derived from graphite, and a Raman shift observed around 1350 cm$^{-1}$ is called D band derived form amorphous carbon or defect of graphite. The higher this G/D ratio of aggregate of carbon nanotubes is, the higher the degree of graphitization is, which is high quality. A higher Raman G/D ratio is better, when it is 30 or more, it can be said to be a high quality aggregate of carbon nanotubes. The upper limit of G/D ratio is about 200. The G/D ratio is preferably 40 or more, and 200 or less, and further preferably 50 or more, and 150 or less. Further, In a Raman spectroscopic analysis method of solid such as carbon nanotube, variation occurs depending on sampling. Then it is preferable that three different places are subjected to Raman spectroscopic analysis. The G/D ratio is preferably expressed by taking an arithmetic average thereof.

The combustion peak temperature of aggregate of carbon nanotubes of the present invention needs to be 550° C. or more, and 700° C. or less, preferably 550° C. or more, and 650° C. or less, more preferably 560° C. or more, and 650° C. or less. Herein, combustion peak temperature is one measured by differential thermal analysis equipment. As the differential thermal analysis equipment, for example, it is possible to use TGA-60 manufactured by Shimadzu Corporation or the like. The combustion peak temperature of a sample can be measured in such manner that about 10 mg each of a sample and α-alumina as a reference is weighed and placed in a platinum dish of differential thermal analysis equipment, which is raised to 900° C. from room temperature in air at a raising temperature velocity of 10° C./min. It is thought that the combustion peak temperature is correlated with quality, diameter and thickness of the bundle of carbon nanotubes. Namely, combustion is thought to be oxidation reaction by attack of oxygen molecules, thus, when the degree of graphitization is low, or there are many defects in graphite sheets constituting carbon nanotubes, attack of oxygen molecules tends to be undergone, so that combustion peak becomes low.

Further, carbon nanotubes with a small diameter generally form a bundle. Even if each is the same carbon nanotube, a bundle thereof is thick, inner carbon nanotubes hardly undergo the attack of oxygen, thus the combustion peak temperature of aggregate of carbon nanotubes rises. Reversely, when a bundle is thin, inner carbon nanotubes also easily undergo the attack of oxygen, thus the combustion peak temperature of aggregate of carbon nanotubes is lowered.

Therefore, an aggregate of carbon nanotubes having a combustion peak temperature of more than 700° C. is high in quality, the diameter is small but a bundle is too thick, thus it becomes very difficult to part the bundle, and becomes difficult to disperse it in a solvent or resin. An aggregate of carbon nanotubes having a combustion peak temperature of less than 550° C. is poor in quality, namely since the degree of graphitization is low, characteristic is not improved when utilized in various applications. From the above points, the combustion peak temperature is 550° C. or more, and 700° C. or less, preferably 550° C. or more, and 650° C. or less, more preferably 560° C. or more, and 650° C. or less in quality and dispersibility.

The aggregate of carbon nanotubes of the present invention having the foregoing characteristic, namely, it is high quality regardless of containing multilayer, regarding an aggregate of carbon nanotubes with a relatively small bundle diameter, since each carbon nanotube is high quality, properties such as electrical conductivity and electron emission characteristic are good, and further, since a bundle is thin, it becomes possible to easily part the bundle in a solvent or resin.

The aggregate of carbon nanotubes of the present invention is good in dispersibility, in the case where a mixture of 10 mg of aggregate of carbon nanotubes, 30 mg of sodium polystyrene sulfonate and 10 mL of water is subjected to ultrasonic homogenizer treatment, subsequently subjected to centrifugal treatment at 20000 G, then 9 mL of supernatant is sampled, it is possible to disperse 0.3 mg/mL or more in the supernatant. The content of aggregate of carbon nanotubes in the supernatant in this condition becomes an index for dispersibility of aggregate of carbon nanotubes.

Sodium polystyrene sulfonate acts as a dispersant of aggregate of carbon nanotubes. In the case of using sodium polystyrene sulfonate aqueous solution, taking the concentration into account, it is added for sodium polystyrene sulfonate to be 30 mg as solid weight, and it is possible to prepare a dispersion liquid for the total to be 10 mL as water. The sodium polystyrene sulfonate can be purchased, for example, from Sigma-Aldrich Corporation. The molecular weights are various, in the above-described measurement, one with a molecular weight of 200000±20000 being an average of commercial products is preferably used. Such sodium polystyrene sulfonate can be purchased, for example, from Sigma-Aldrich Corporation.

Ultrasonic homogenizer treatment denotes that a mixture of 10 mg of aggregate of carbon nanotubes, 30 mg of sodium polystyrene sulfonate and 10 mL of water is subjected to dispersion treatment under ice cooling for 20 minutes using an ultrasonic homogenizer at output of 25 W. As the ultrasonic homogenizer, for example, UH-600 manufactured by SMT Corporation or the like can be used.

Centrifugal treatment denotes a centrifugal operation at 20000 G for 15 minutes by a centrifugal separator. As the centrifugal separator, for example, MX-300 manufactured TOMY Co., Ltd. or the like can be used.

Additionally, sampling of supernatant is conducted in 30 minutes after a centrifugal operation. Since the aggregate of carbon nanotubes of the present invention is good in dispersibility, after the above-described operation, when 9 mL of supernatant is sampled, it is possible to achieve that the content of aggregate of carbon nanotubes in the supernatant is 0.3 mg/mL or more, in preferable modes, it is possible to achieve 0.3 mg/mL to 0.5 mg/mL. The amount of aggregate of carbon nanotubes in supernatant is measured as follows. Namely, 9 mL of supernatant is sampled away, 1 mL of liquid containing the remaining aggregate of carbon nanotubes is filtered using a filter having a mesh of 1 μm in pore diameter, washed with water and dried to measure the weight of aggregate of carbon nanotubes. A value that the weight of the remaining aggregate of carbon nanotubes is subtracted from 10 mg corresponds to the aggregate of carbon nanotubes contained in 9 mL of supernatant, based on which, it is reduced to a content per 1 mL. In this case, when the amount of aggregate of carbon nanotubes in supernatant is little, it is an aggregate of carbon nanotubes with poor dispersibility. When dispersibility is poor, thereafter upon using the dispersion liquid in various applications, since the concentration of aggregate of carbon nanotubes in the dispersion liquid is dilute, it becomes difficult to adjust the surface resistance value when coated on a film or the like, and a cost problem arises due to low yield.

Since the aggregate of carbon nanotubes of the present invention is high quality and a bundle diameter is relatively small, the dispersibility is excellent, when coating the dispersion liquid of aggregate of carbon nanotubes onto a substrate to make a film, one with a light transmittance of 85% or more and a surface resistance value of less than $1 \times 10^4 \Omega/\square$ is obtained, in preferable modes, it is possible to achieve 85 to 88% in light transmittance and, $1 \times 10^2$ or more, less than $1 \times 10^4 \Omega/\square$ in surface resistance of the above-described film. Additionally, values of light transmittance and surface resistance value are defined as those when produced in the following method. Namely, a dispersion liquid of aggregate of carbon nanotubes is prepared as follows. A mixture of 10 mg of aggregate of carbon nanotubes, 30 mg of sodium polystyrene sulfonate (weight average molecular weight of 200000±20000, manufactured by Sigma-Aldrich Corporation) and 10 mL of water is subjected to ultrasonic homogenizer treatment, subsequently subjected to centrifugal treatment at 20000 G, then 9 mL of supernatant is sampled to prepare a dispersion liquid. To 300 μL of this dispersion liquid, 300 μL of methanol/water (weight ratio 1/1) is added as a wetting agent, then, coated on a PET film (manufactured by Toray Industries Inc., Luminar (registered trademark) U36, light transmittance 90.7%, 15 cm×10 cm) using a bar coater (No. 8, coating thickness of 12 μm), dried in air, then rinsed with distilled water, and dried at 60° C. in an drier for 2 minutes, thereby to fix the aggregate of carbon nanotubes on the film.

Light transmittance of conductive film is measured together with a substrate using a light source of 550 nm.

Electrical conductivity of conductive film is evaluated by measuring a surface resistance value of film. Surface resistance value can be measured using a 4-terminal 4-probe method according to JIS K7149, for example by a Loresta EPMCP-T360 (manufactured by Dia Instruments Co., Ltd.). In high resistance measurement, it can be measured using Hiresta UP MCP-HT450 (manufactured by Dia Instruments Co., Ltd., 10 V, 10 seconds).

In the aggregate of carbon nanotubes of the present invention, it is preferable that diameter of each carbon nanotube is small. By a small diameter, properties of electrical conductivity of each carbon nanotube and electron emission characteristic become better.

Specifically, it is preferable that when observed by a transmission electron microscope, 50 or more of 100 carbon nanotubes are in an outer diameter range of 1.5 to 2.0 nm. It is more preferable that 60 or more of 100 carbon nanotubes are in this range. The measurement of outer diameter of the carbon nanotube is carried out as follows. An aggregate of carbon nanotubes is observed at a magnification of 400000 by a transmission electron microscope, in a view of 75 nm square, 100 pieces of carbon nanotubes randomly selected from a view that 10% or more of view area is aggregates of carbon nanotubes are measured for outer diameter and evaluated thereon. In the case where 100 pieces in one view cannot be measured, it is measured from a plurality of views till reaching 100 pieces. In this case, one piece of carbon nanotube will count as one piece when part of a carbon nanotube is seen in a view, and both ends must not necessarily be seen. Further, although it is recognized as two pieces in a view, they may be connected outside the view into one piece, in this case, it will count as two pieces.

The aggregate of carbon nanotubes of the present invention becomes good in dispersibility in a solvent or the like due to the small bundle diameter. Above all, when observed by a scanning electron microscope, an average in bundle diameter of aggregate of carbon nanotubes is preferably 20 nm or less, and particularly preferably 15 to 20 nm. This bundle diameter is observed at a magnification of 60000 by a scanning electron microscope, in a view of 1 μm square, 50 pieces of bundle put together are randomly selected from a view that 10% or more of view area is aggregates of carbon nanotubes, and the 50 pieces of bundles of carbon nanotubes are measured for bundle diameter, and the arithmetic average is evaluated. In the case where 50 pieces of bundles in one view cannot be measured, it is measured from a plurality of views till reaching 50 pieces. In this case, one piece of bundle of aggregate of carbon nanotubes will count as one piece when part of a bundle of aggregate of carbon nanotubes is seen in a view, and both ends must not necessarily be seen. Further, although it is recognized as two pieces in a view, they may be connected outside the view into one piece, in this case, it will count as two pieces. Additionally, the aggregate of carbon nanotubes of the present invention has generally a diameter of several nm, when observed at a magnification of 60000 by a scanning electron microscope, carbon nanotubes not put together as a bundle cannot be observed. An aggregate of carbon nanotubes that can be observed at a magnification of 60000 by a scanning electron microscope is generally a bundle structure.

The above-described aggregate of carbon nanotubes can be dispersed in a dispersant to be a dispersion. It is sometimes called a dispersion liquid when dispersed in a liquid dispersant. This dispersion liquid can contain additives such as surfactant and various kinds of polymer materials.

The surfactant and some kind of polymer material help to improve dispersing ability and dispersion stabilizing ability of aggregate of carbon nanotubes. Surfactants are classified into an ionic surfactant and a nonionic surfactant, both surfactants can be used in the present invention. As the surfactant, for example, the following surfactants are mentioned. Such surfactants can be used alone or in mixture of 2 kinds or more thereof.

Ionic surfactants are classified into a cationic surfactant, an amphoteric surfactant and an anionic surfactant. As a cationic surfactant, an alkylamine salt, quaternary ammonium salt and the like are listed. As an amphoteric surfactant, an alkyl betaine type surfactant, amine oxide type surfactant and the like are listed. As an anionic surfactant, there are listed alkylbenzenesulfonate such as dodecylbenzenesulfonate, and aromatic sulfonic acid type surfactant such as dodecyl phenyl ether sulfonate, a monosoap type anionic surfactant, ether sulfate type surfactant, phosphate type surfactant and carboxylic acid type surfactant. Among these, one containing an aromatic ring, namely an aromatic type ionic surfactant is preferable because it is excellent in dispersing ability, dispersion stabilizing ability and higher concentration, in particular, an aromatic type ionic surfactant such as alkylbenzenesulfonate and dodecyl phenyl ether sulfonate is preferable.

As an example of nonionic type surfactant, there are listed a sugar ester type surfactant such as sorbitan fatty ester and polyoxyethylene sorbitan fatty ester; a fatty ester type surfactant such as polyoxyethylene fatty ester and polyoxyethylene fatty diester; an ether type surfactant such as polyoxyethylene alkyl ether, polyoxyethylene alkyl phenyl ether and polyoxyethylene-polypropylene glycol; and an aromatic type nonionic surfactant such as polyoxyalkylene octyl phenyl ether, polyoxyalkylene nonyl phenyl ether, polyoxyalkyl dibutyl phenyl ether, polyoxyalkyl styryl phenyl ether, polyoxyalkyl benzyl phenyl ether, polyoxyalkyl biphenyl ether and polyoxyalkyl cumyl phenyl ether. Above all, an aromatic type nonionic surfactant is preferable because it is excellent in dispersing ability, dispersion stabilizing ability and higher concentration, in particular, polyoxyethylene phenyl ether is preferable.

A conductive polymer or nonconductive polymer can be added in an aggregate of carbon nanotubes. As the nonconductive polymer, there can be used a water soluble polymer such as polyvinyl alcohol, polyvinyl pyrrolidone, ammonium polystyrene sulfonate and sodium polystyrene sulfonate; and a sugar polymer such as carboxymethyl cellulose sodium salt (Na-CMC), methyl cellulose, hydroxyethyl cellulose, amylose, cycloamylose and chitosan. Further, there can be used a conductive polymer such as thiophene, polyethylene dioxythiophene, polyisothianaphthene, polyaniline, polypyrrole and polyacetylene, and their derivatives. When water is used as a dispersant, it is most preferable that a compound having a benzene ring and a hydrophilic group is used as a dispersant. The reason is that a benzene ring and a hydrophilic group have strong affinity with carbon nanotube and water, respectively. From this fact, the dispersant works effectively to disperse carbon nanotubes in water. Further, a hydrophilic group is preferably ionic because hydrophilic groups are repelled each other to part carbon nanotubes mutually. Above all, it is preferable that by using a water soluble polymer such as ammonium polystyrene sulfonate and sodium polystyrene sulfonate, a conductive characteristic of aggregate of carbon nanotubes can be efficiently exhibited.

The dispersant of aggregate of carbon nanotubes is not particularly restricted. An aqueous solvent or a nonaqueous solvent may be used. As a nonaqueous solvent, there can be used hydrocarbons (toluene, xylene, etc.), chlorine-containing hydrocarbons (methylene chloride, chloroform, chlorobenzene, etc.), ethers (dioxane, tetrahydrofuran, methyl cellosolve, etc.), ether alcohol (ethoxyethanol, methoxyethanol, etc.), esters (methyl acetate, ethyl acetate, etc.), ketones (cyclohexanone, methyl ethyl ketone, etc.), alcohols (ethanol, isopropanol, phenol, etc.), lower carboxylic acid (acetic acid, etc.), amines (triethylamine, trimethanolamine, etc.), nitrogen-containing polar solvent (N,N-dimethylformamide, nitromethane, N-methylpyrrolidone, etc.), and sulfur compounds (dimethyl sulfoxide, etc.).

Among these, as the dispersant, it is preferable that a dispersant contains water, alcohol, toluene, acetone or ether, and a combined solvent thereof. When an aqueous solvent is required, and when a binder described below is used and the binder is an inorganic polymer type binder, polar solvents such as water, alcohols and amines are used. Further, as described below, when a liquid at room temperature is used as a binder, it can be used as a dispersant. Further, as described below, for an aqueous solvent, when a liquid such as alcohol as a wetting agent is used, since this wetting agent acts as a dispersant, it is treated as a dispersant.

A preferable mixing amount of each component in the above-described dispersion liquid is as follows. The concentration of aggregate of carbon nanotubes in a dispersion is preferably 0.01 weight % or more, and 20 weight % or less, and preferably 0.1 to 10 weight %. The content in a dispersion of an additive selected from surfactant, conductive polymer and nonconductive polymer is preferably 0.1 to 50 weight %, more preferably 0.2 to 30 weight %. The mixing ratio of the above-described additive and aggregate of carbon nanotubes (additive/aggregate of carbon nanotubes) is preferably 0.1 to 20 in weight ratio, and more preferably 0.3 to 10. The dispersion of the present invention may contain the above-described aggregate of carbon nanotubes, an additive selected from surfactant, conductive polymer and nonconductive polymer, and a substance other than a dispersant. After such dispersion liquid of aggregate of carbon nanotubes is prepared, a conductive film can be formed by coating it on a substrate.

The method of coating a dispersion liquid of aggregate of carbon nanotubes is not particularly limited. Known coating methods can be utilized, for example, including spray coating, immersion coating, spin coating, knife coating, kiss coating, gravure coating, screen printing, inkjet printing, pad printing, other kind of printing, or roll coating. Further, coating may be done several times, and coating may be combination of different two kinds of coating methods. Most preferable coating method is roll coating.

Thickness of coating (wet thickness) depends on the concentration of coating liquid, thus it is not particularly specified as long as a desired light transmittance and surface resistance value is obtained. However, above all, it is preferably form 0.1 µm to 50 µm. Further preferable is from 1 µm to 20 µm.

When an aqueous dispersion of aggregate of carbon nanotubes is coated on a substrate, a wetting agent may be added in the dispersion. In particular, when coated on a nonhydrophilic substrate, adding a wetting agent such as surfactant and alcohol can coat a dispersion liquid on the substrate without being shed. As a wetting agent, alcohols are preferable, among alcohols, methanol or ethanol is preferable. Since lower alcohols such as methanol and ethanol are highly volatile, they can be easily removed in drying a substrate after coating. In some cases, a mixed solution of alcohol and water may be used.

In this way, regarding a conductive film that a dispersion liquid of aggregate of carbon nanotubes is coated, after the liquid is coated on a substrate, unnecessary dispersant can be removed by methods such as air drying, heating and reduced pressure. The aggregate of carbon nanotubes forms a three dimensional network structure thereby, which is fixed on a substrate. Thereafter, the dispersant being a component in the liquid is removed using a suitable solvent. By this operation, dispersion of charge becomes easy, and electrical conductivity of transparent film is improved.

As a solvent to remove the above-described dispersant, it is not particularly limited as long as it dissolves the dispersant, it may be an aqueous solvent or a nonaqueous solvent. Specifically when it is an aqueous solvent, water, alcohols, acetonitrile and the like are listed, when it is a nonaqueous solvent, chloroform, toluene and the like are listed.

After a transparent conductive film containing the aggregate of carbon nanotubes is formed by coating the liquid as described above, it is preferable that this film is overcoated with a binder material capable of forming an organic or inorganic transparent membrane. Overcoating is effective on further dispersion and transfer of charge.

Further, the transparent conductive film of the present invention can also be obtained in such manner that a binder material capable of forming an organic or inorganic transparent membrane is contained in a liquid, and coated on a suitable substrate, then according to need, heated to dry a coated film or bake (harden). The heating condition in this case is set suitably according to the kind of binder. When the binder is a light or radiation hardening type, not by heat hardening, a coated film is irradiated by light or radiation right after coating to be hardened. As radiation, ionic radiations can be used, such as electron beam, ultraviolet light, X-ray, gamma ray, and irradiation dose is determined by the kind of binder.

As the binder material, it is not particularly limited as long as it is used as conductive paints, there can be used various organic and inorganic binders, namely, a transparent organic polymer or the precursor (hereinafter, sometimes called "organic polymer type binder") or an inorganic polymer or the precursor (hereinafter, sometimes called "inorganic polymer type binder"). The organic polymer type binder may be any one of thermoplastic, thermosetting and radiation hardening ones, As a suitable organic binder, there are organic polymers such as polyolefin type (polyethylene, polypropylene, etc.), polyamide type (nylon 6, nylon 11, nylon 66, nylon 6, 10, etc.), polyester type (polyethylene terephthalate, polybutylene terephthalate, etc.), silicone type polymer, vinyl type resin (polyvinyl chloride, polyvinylidene chloride, polyacrylonitrile, polyacrylate, polystyrene derivative, polyvinyl acetate, polyvinyl alcohol, etc.), polyketone, polyimide, polycarbonate, polysulfone, polyacetal, fluorocarbon resin, phenol resin, urea resin, melamine resin, epoxy resin, polyurethane, cellulosic polymer, proteins (gelatin, casein, etc.), chitin, polypeptide, polysaccharides and polynucleotide, and precursors of these polymers (monomer or oligomer). These can form an organic polymer type transparent membrane by only evaporation of solvent, or heat hardening, light hardening or hardening by radiation irradiation.

A preferable organic polymer type binder is a compound having an unsaturated bond capable of radical polymerization hardening by radiation or light, which is a monomer having a vinyl group or a vinylidene group, its oliogomer or polymer. As this kind of monomer, there are styrene derivatives (styrene, methyl styrene, etc.), acrylic acid, methacrylic acid or their derivatives (alkyl acrylate or methacrylate, ally acrylate or methacrylate, etc.), vinyl acetate, acrylonitrile, itaconic acid and the like. Oligomer or polymer is preferably a compound having a double bond in a main chain, or a compound having an acryloyl or methacryloyl group in both terminals of a straight chain. This kind of radical polymerization hardening binder has high hardness and excellent abrasion resistance, and can form a conductive membrane of high degree of transparency.

As examples of the inorganic polymer type binder, there are sol of metal oxide such as silica, tin oxide, aluminum oxide and zirconium oxide, or a hydrolyzable or thermally-degradable organic phosphorous compound and organic boron compound to become a precursor of inorganic polymer, and an organic metal compound such as organic silane compound, organic titanium compound, organic zirconium compound, organic lead compound, and organic alkaline earth metal compound. As specific examples of the hydrolyzable or thermally-degradable organic metal compound, they are metal complexes of alkoxide or the partial hydrolysate, lower carboxylate such as acetate, and acetyl acetone.

When an inorganic polymer type binder of one kind or, 2 kinds or more thereof is fired, a transparent membrane of glassy inorganic polymer type composed of oxide or composite oxide can be formed. The inorganic polymer type matrix is generally glassy, high in hardness, excellent in abrasion resistance, and also transparency is high.

The used amount of binder may be a sufficient amount to overcoat, or a sufficient amount to obtain a suitable viscosity for coating when mixed in a liquid. When it is too small, coating does not work well, and when too large, electrical conductivity is damaged, which is bad.

As the dispersant used in the present invention, the foregoing solvent is generally used, in the case of an organic polymer type binder of light hardening or radiation hardening, by choosing a liquid binder at normal temperature, it is possible to use a binder of 100% reactivity without presence of solvent, or as a dispersant with no solvent that this is diluted with an unreactive liquid resin component. From this, evaporation of solvent in hardening and drying the coated membrane does not occur and hardening time is greatly shortened and recovery operation of solvent becomes unnecessary.

A liquid for forming a transparent conductive film can compound additives such as coupling agent, crosslinker, stabilizer, antisettling agent, coloring agent, charge adjusting agent and lubricant, in addition to the above-described aggregate of carbon nanotubes, a surfactant, dispersant, solvent and binder.

Further, the liquid for forming a transparent conductive film of the present invention can further contain other conductive organic material, conductive inorganic material or a combination of these materials. As the conductive organic material, there can be preferably listed buckyball, carbon black, fullerene, various kinds of carbon nanotubes, and particles containing these.

As the conductive inorganic material, there are listed aluminum, antimony, beryllium, cadmium, chrome, cobalt, copper, dope metal oxide, iron, gold, lead, manganese, magnesium, mercury, metal oxide, nickel, platinum, silver, steel, titanium, zinc and particles containing these. Preferable are indium tin oxide, antimony tin oxide and a mixture thereof.

A film obtained by containing these conductive materials, or a film obtained by overcoating is very advantageous in dispersion or transfer of charge. Further, a layer containing a conductive material other than the aggregates of carbon nanotubes and a layer containing the aggregates of carbon nanotubes may be laminated.

A film to become a substrate of a conductive film is not particularly restricted. When transparency is necessary, a transparent film, for example, PET film is used.

The conductive film of the present invention can be used while being bonded with a substrate, or it is detached from the substrate, and used as a self-supporting film. To produce a self-supporting film, after an organic polymer type binder is further coated on a transparent conductive film, the substrate may be detached. Further, it can be used in such manner that a substrate in production is burned out by thermal decomposition, or it is melted to transfer the conductive film on other substrate. In this case, a thermal decomposition temperature of a substrate in production is preferably lower than that of a transfer substrate.

The thickness of the conductive film of the present invention can cover from a thickness of medium degree to very thin thickness. For example, the film of the present invention can be between about 0.5 nm and about 1000 μm in thickness. The thickness of film is preferably about 0.005 to about 1000 μm, more preferably about 0.05 to about 500 μm, more preferably about 1.0 to about 200 μm, and further preferably about 1.0 to about 50 μm.

The conductive film of the present invention thus obtained has a surface resistance of less than $1\times10^4\Omega/\square$, and the light transmittance of 550 nm satisfies the following condition:

light transmittance of conductive film/light transmittance of transparent substrate>0.85

Preferably, a surface resistance is $1\times10^2\Omega/\square$ or more, and less than $5\times10^3\Omega/\square$, and the light transmittance of 550 nm satisfies the following condition:

0.99>light transmittance of conductive film/light transmittance of transparent substrate>0.90

The aggregate of carbon nanotubes of the present invention can also be dispersed in a resin to be a dispersion. In this case, the resin used is not particularly limited, either a thermoplastic resin or a thermosetting resin can be used. A thermoplastic resin denotes a resin capable of thermal molding by heating. As the specific example, there are listed a polyethylene resin, polypropylene resin, polystyrene resin, rubber-modified polystyrene resin, acrylonitrile-butadiene-styrene (ABS) resin, acrylonitrile-styrene (AS) resin, polymethyl methacrylate resin, acryl resin, polyvinyl chloride resin, polyvinylidene chloride resin, polyethylene terephthalate resin, ethylene vinyl alcohol resin, cellulose acetate resin, ionomer resin, polyacrylonitrile resin, polyamide resin, polyacetal resin, polybutylene terephthalate resin, polylactic acid resin, polyphenylene ether resin, modified polyphenylene ether resin, polycarbonate resin, polysulfone resin, polyphenylene sulfide resin, polyetherimide resin, polyethersulfone resin, polyallylate resin, thermoplastic polyimide resin, polyamideimide resin, polyetheretherketone resin, polyketone resin, liquid crystal polyester resin, fluorocarbon resin, syndiotactic polystyrene resin, cyclic polyolefin resin and the like. These thermoplastic resins can be used in one kind, or in concomitant use of 2 kinds or more thereof. A thermosetting resin denotes a resin having a characteristic capable of being converted to be substantially insoluble and infusible in hardening by heating or by means of radiation or catalyst. As the specific example, there are listed a phenol resin, urea resin, melamine resin, benzoguanamine resin, alkyd resin, unsaturated polyester resin, vinylester resin, diallyl terephthalate resin, epoxy resin, silicone resin, urethane resin, furan resin, ketone resin, xylene resin, thermosetting polyimide resin and the like. These thermosetting resins can be used in one kind, or in concomitant use of 2 kinds or more thereof. Further, when the main component of the resin of the present invention is a thermoplastic resin, a small amount of thermosetting resin can be added in a range not damaging the characteristic of thermoplastic resin, reversibly when the main component is a thermosetting resin, a small amount of thermoplastic resin can be added in a range not damaging the characteristic of thermosetting resin as well.

The carbon nanotubes added in a resin is preferably 0.01 to 50 weight %, more preferably 0.01 to 20 weight %, and further preferably 0.1 to 10 weight %. When the added amount is too large, the characteristic of resin to become base is sometimes lost, the added amount of carbon nanotubes is an amount sufficient to provide a desired characteristic and the smaller the better.

The above-described dispersion can be produced by dispersing carbon nanotubes in a resin. The method of dispersing carbon nanotubes in a resin is not particularly restricted. As the specific methods, any following method may be used: a method that after a resin is dissolved in a solvent, in a state of the resin solution, carbon nanotubes are added, stirred and mixed to disperse, then the solvent is removed to obtain a resin composition; a method that in a state that a thermoplastic resin is heat melted, carbon nanotubes are added, and dispersed by a melt kneading machine such as mixer, kneader and extruder to obtain a resin composition; in the case of thermosetting resin, a method that carbon nanotubes are added in monomer or prepolymer before hardening, dispersed by stirring and mixing, subsequently, the resin is hardened to obtain a resin composition; and a method that carbon nanotubes are added in monomer, dispersed by stirring and mixing, subsequently, polymerized to obtain a resin composition.

The method for producing an aggregate of carbon nanotubes is not limited as long as the aggregate of carbon nanotubes specified by the present invention is obtained, for example, it is produced as follows.

In a vertical fluid bed reactor, a fluid bed is formed by a powdery catalyst supporting iron on magnesia over the whole area in horizontal cross section direction of the reactor, by flowing methane in a vertical direction inside the reactor, methane is contacted with the catalyst at 500 to 1200° C. to produce an aggregate of carbon nanotubes, then, the aggregate of carbon nanotubes obtained is subjected to 2 kinds or more of oxidation treatments. Namely, the aggregate of carbon nanotubes containing double-walled carbon nanotubes obtained by the above-described synthetic method of carbon nanotubes is subjected to oxidation treatment in a gas phase, then further subjected to oxidation treatment in a liquid phase, thereby to obtain the aggregate of carbon nanotubes of the present invention.

By supporting iron, a catalyst onto magnesia of a support, the particle diameter of iron is easily controlled, and sintering hardly occurs under high temperature even if iron is present in high density. Therefore, it is possible to efficiently synthesize a lot of carbon nanotubes with high quality. Further, since magnesia dissolves in acidic aqueous solution, only by treating with acidic aqueous solution, both magnesia and iron can be removed, which can simplify a purification process.

Regarding magnesia, a commercial product may be used or one synthesized may be used. As a preferable production method of magnesia, there are methods where metal magnesium is heated in air, magnesium hydroxide is heated at 850° C. or more, and magnesium hydroxide carbonate $3MgCO_3 \cdot Mg(OH)_2 \cdot 3H_2O$ is heated at 950° C. or more.

Among magnesia, light magnesia is preferable. Light magnesia is magnesia with a low bulk density, specifically, 0.20 g/mL or less is preferable, and 0.05 to 0.16 g/mL is preferable from the point of flowability of catalyst. Bulk density is a mass of powder per unit bulk volume. The measuring method of bulk density is shown below. The bulk density of powder is sometimes influenced by temperature and humidity in measurement. Bulk density herein is a value when measured at a temperature of 20±10° C. and humidity of 60±10%. The measurement is done in such manner that using a 50 mL graduated cylinder as a measuring container, powder is added to fill a predetermined volume while tapping the bottom of the graduated cylinder lightly. In measuring bulk density, 10 mL of powder is to be added, in the case where a measurable sample is not sufficient, it is done using an amount as near to 10 mL as possible. Thereafter, after dropping of the bottom of the graduated cylinder from 1 cm height over a floor surface is repeated 20 times, the change rate of volume value occupied with powder is confirmed by eye within ±0.2 mL (±2% when sample is few), and packing operation is finished. In the case where there is change exceeding ±0.2 mL (±2%) by eye in volume value, powder is further added while tapping the bottom of the graduated cylinder lightly, again dropping of the bottom of the graduated cylinder from 1 cm height over a floor surface is repeated 20 times, and no change exceeding ±0.2 mL (±2%) in volume value occupied with powder is confirmed by eye and packing operation is finished. The weight of powder of a constant amount packed in the above method is obtained by repeating 3 times, a value that the average weight is divided by the volume occupied with powder (=weight (g)/volume (mL)) is defined as bulk density of powder.

Iron to be supported on a support material is not limited to a zerovalent state. It can be assumed to be a zerovalent state during reaction, but it may a compound widely containing iron or iron species. For example, there are used organic salts or inorganic salts such as iron formate, iron acetate, iron trifluoroacetate, iron ammonium citrate, iron nitrate, iron sulfate and iron halide; and complex salts such as ethylnenediaminetetraacetate complex and acetylacetonate complex. Further, iron is preferably a fine particle. The particle diameter of a fine particle is preferably 0.5 to 10 nm. When iron is a fine particle, a carbon nanotube with small outer diameter tends to be produced.

The method to support iron on magnesia is not particularly restricted. For example, magnesia is immersed in a nonaqueous solution that salt of ion to be supported is dissolved (for example, ethanol solution) or in an aqueous solution, sufficiently dispersed and mixed by stirring and ultrasonic irradiation, then dried (immersion method). Further, iron may be supported on magnesia by heating at high temperatures (300 to 1000° C.) in a gas selected from air, oxygen, nitrogen, hydrogen, inert gas and mixed gas thereof, or in vacuum.

The more the supported amount of iron is, the higher the yield of carbon nanotube becomes, but when too much, the particle diameter of iron becomes large, and a carbon nanotube produced becomes thick. When the supported amount of iron is small, the particle diameter of iron to be supported becomes small, and a carbon nanotube with small outer diameter is obtained, but the yield tends to be lowered. The optimum supported amount of iron differs depending on pore content, outer surface area of magnesia and supporting method, it is preferably 0.1 to 20 weight % relative to magnesia, and particularly preferably 0.2 to 10 weight %.

A vertical fluid bed reactor is a reactor which is designed for methane to flow in a vertical direction (hereinafter, sometimes called "longitudinal direction"). Methane flows in a direction from one end of the reactor to the other end, and methane passes through a catalyst layer. As the reactor, for example, a reactor of tubular shape can be preferably used. Additionally, the vertical direction described above includes a direction having some angle of gradient to a vertical direction (for example, 90°±15° to a horizontal plane, preferably 90°±10°). Additionally, a vertical direction is preferable. Additionally, a feed section and a discharge section are not necessarily ends of a reactor, it is enough that methane flows in the above-described direction and passes through a catalyst layer during the flowing process.

In a vertical fluid bed reactor, the catalyst is in a state being present over the whole area in a horizontal cross section direction of the reactor, and it must be a state that a fluid bed is formed during reaction. By doing so, it is possible to contact a catalyst with methane effectively. In the case of a horizontal reactor, in order to contact a catalyst with methane effectively, to be a state being present in the whole area of cross section of the reactor in a vertical direction to a stream of methane, a catalyst must be sandwiched from both sides against the attraction of gravity. However, in a production reaction of aggregate of carbon nanotubes, aggregates of carbon nanotubes are produced on the catalyst as the reaction proceeds and the volume of the catalyst increases, thus a method sandwiching catalyst from both sides is not preferable. Further, it is difficult to form a fluid bed in a horizontal type. In the present invention, a reactor is a vertical type, a table that gas can transmit is equipped, on which catalyst is placed, thereby catalyst can be uniformly present in the cross section direction of the reactor without sandwiching catalyst from both sides, and a fluid bed can also be formed in passing methane in a vertical direction. The state that catalyst is present over the whole area in the horizontal cross section direction of a vertical fluid bed reactor means that catalyst spreads entirely in the horizontal cross section direction and a table at the bottom of catalyst is not seen. As preferable embodiments of such state, for example, there are the following modes.

A. a table for placing a catalyst that gas can transmit in a reactor (ceramic filter, etc.) is equipped, a catalyst is filled therein by a predetermined thickness. The up and down sides of this catalyst layer may be somewhat concave-convex (FIG. 1 (*a*)). FIG. 1 (*a*) is a conceptual illustration showing a state that a table 2 for placing a catalyst is equipped in a reactor 1, on which a catalyst 3 is present entirely in the horizontal cross section direction of the reactor.

B. On the same table for placing a catalyst as in A, a catalyst and a material other than a catalyst (filler) are mixed and filled. Although this catalyst layer is preferably uniform, it may be somewhat concave-convex (FIG. 1 (*b*)). FIG. 1 (*b*) is a conceptual illustration showing a state that a table 2 for placing a catalyst is equipped in a reactor 1, on which a mixture 4 of a catalyst with a material other than a catalyst is present entirely in the horizontal cross section direction of the reactor.

C. It is a state that by dropping a catalyst from an upper part of a reactor by spraying or the like, catalyst powder is present uniformly via gas in the horizontal cross section direction of the reactor (FIG. 1 (*c*)). FIG. 1 (*c*) a conceptual illustration showing a state that a catalyst 5 sprayed from an upper part of a reactor 1 is spread entirely in the horizontal cross section direction of the reactor. As one example of vertical fluid bed reactors, there are listed a mode that a catalyst is dropped from an upper part of a reactor by spraying or the like as described in C, and a mode that a catalyst flows generally called a boiling bed type (method near the foregoing A or B). Further, as an example of a fixed bed type, a mode like the foregoing A or B is mentioned.

In the fluid bed type, a catalyst is continuously fed, and an aggregate containing a catalyst and an aggregate of carbon nanotubes after reaction is continuously drawn out, thereby a continuous synthesis is possible, it is preferable because an aggregate of carbon nanotubes can be efficiently obtained. Further, magnesia is used as a support of catalyst in the present invention, magnesia is, from its particle characteristic (specific gravity, bulk density, surface charge, etc.), very good in flowability, in particular, it is suitable for synthesizing an aggregate of carbon nanotubes in a fluid bed reactor. In the case where a magnesia support is used for catalyst, when an aggregate of carbon nanotubes is synthesized in a fluid bed type, since a flowing state is good, a long carbon nanotube tends to be produced. The long carbon nanotube defined here is a carbon nanotube with an average length of 1 μm or more. Since methane as a raw material and a catalyst are uniformly contacted efficiently resulting from good flowability in a fluid bed type reaction, it is thought that synthesis reaction of carbon nanotube is conducted uniformly, catalyst-coating by impurities such as amorphous carbon is suppressed, and catalyst activity continues for long time, resulting in obtaining the long carbon nanotube.

In contrast to a vertical reactor, a horizontal reactor denotes a reacting apparatus of a mode that a catalyst mounted on a quartz plate is placed in a reactor installed in a lateral direction (horizontal direction), methane contacts catalyst by passing on the catalyst and reacts. In this case, a carbon nanotube is produced on the surface of catalyst, since methane does not reach the inside of catalyst, reaction hardly takes place. In contrast to this, in a vertical reactor, since methane of a raw material can contact the whole catalyst, it is possible to synthesize a lot of aggregates of carbon nanotubes efficiently.

A reactor is preferably heat resistant, and one made of a heat resistant material such as quartz and alumina is preferable.

By passing methane from the bottom part or upper part of catalyst layer placed in a reactor, through contact with a catalyst and reaction, an aggregate of carbon nanotubes is produced.

The temperature for contacting a catalyst with methane is preferably 600 to 950° C., and further preferably in a range of 700 to 900° C. When the temperature is lower than 600° C., the yield of aggregate of carbon nanotubes becomes poor. Further, when the temperature is higher than 950° C., as well as material of a reactor used is restricted, carbon nanotubes start bonding each other, making the shape control of carbon nanotube difficult. A reactor may be set to a reaction temperature while contacting methane with a catalyst, or after completion of pretreatment by heat, a reactor is set to a reaction temperature, then feed of methane may start.

Before a reaction for producing an aggregate of carbon nanotubes, a catalyst may be pretreated by heat. The time of pretreatment by heat is not particularly limited, but when it is too long, agglomeration of metal occurs on magnesia, leading to production of carbon nanotube with a large outer diameter sometimes, so that it is preferably within 120 minutes. The temperature of pretreatment may be less than reaction temperature as long as catalyst activity is exhibited, may be the same as reaction temperature, or higher than reaction temperature. By conducting pretreatment by heat, there is a case that catalyst becomes a more active state.

Pretreatment by heat and reaction for producing an aggregate of carbon nanotubes are preferably conducted in reduced pressure or atmospheric pressure.

In the case where contact of a catalyst with methane is conducted in reduced pressure, a reaction system can be reduced pressure by a vacuum pump or the like. Further, in the case where pretreatment and reaction are conducted in atmospheric pressure, a mixed gas of methane and a diluting gas may be contacted with a catalyst.

The diluting gas is not particularly limited, but one other than oxygen gas is preferably used. Oxygen is generally not used because of possibility of explosion, but it may be used outside the explosive range. As a diluting gas, nitrogen, argon, hydrogen, helium and the like are preferably used. These gases have effects on control of linear velocity and concentration of methane, and as a carrier gas. Hydrogen is preferable because it has an effect on activation of catalyst metal. A gas of high molecular weight like argon has a large annealing effect, and it is preferable when annealing is targeted. In particular, nitrogen and argon are preferable.

In a method for producing the aggregate of carbon nanotubes of the present invention, as described above, after an aggregate of carbon nanotubes is produced, the aggregate of carbon nanotubes is subjected to oxidation treatment in a gas phase, and further subjected to oxidation treatment in a liquid phase. The temperature of oxidation treatment in a gas phase is preferably 300 to 1000° C., and further preferably 400 to 900° C. The oxidizing temperature of aggregate of carbon nanotubes in a gas phase is influenced by atmosphere gas, thus a particularly preferable temperature differs depending on atmosphere. Specifically, for example, in the case of being contacted with oxygen, it is preferably conducted at 400 to 900° C. Further, under atmospheric pressure, burning treatment is preferably conducted within a range of combustion peak temperature ±50° C. of the aggregate of carbon nanotubes. Further, in the case of using a mixed gas of oxygen with an inert gas as a gas phase, it is preferable that when oxygen concentration is high, it is subjected to oxidation treatment at a relatively low temperature, whereas when oxygen concentration is low, it is subjected to oxidation treatment at a relatively high temperature. Further, oxidation treatment can be conducted by being intermittently contacted with oxygen or a mixed gas containing oxygen, in this case, even when oxygen concentration is high, the treatment can be conducted at a relatively high temperature (for example, 500 to 1200° C., preferably a temperature maintained at synthesis temperature after synthesis of carbon nanotube). This is because the reaction stops immediately after oxygen is consumed even if oxidation occurs owing to flowing oxygen or a mixed gas containing oxygen intermittently. Ordinarily, it is more preferably conducted in an oxygen concentration of 1 to 10% at 700 to 1000° C. By doing so, it becomes possible to control oxidation reaction.

The above-described combustion peak temperature of aggregate of carbon nanotubes can be measured by conducting thermal analysis of aggregate of carbon nanotubes in air. About 10 mg of a sample is placed in a differential scanning calorimeter (for example, DTG-60 manufactured by Shimadzu Corporation), raised to 900° C. from room temperature in air at a raising temperature velocity of 10° C./min to obtain an exothermic peak temperature in combustion of a sample.

By conducting burning treatment in a range of the thus obtained combustion peak temperature ±50° C., it is possible to eliminate impurities in the aggregate of carbon nanotubes produced and single-walled carbon nanotubes with low durability. From this, the purity of carbon nanotubes with two layers or more can be improved. In this case, when burning treatment is conducted at less than combustion peak temperature −50° C., impurities and single-walled carbon nanotubes are not burned and not eliminated, thus the purity of carbon nanotubes with two layers or more cannot be improved. Further, when burning treatment is conducted at more than combustion peak temperature +50° C., all aggregates of carbon nanotubes are burned and lost. Therefore, it is preferable to around the combustion peak temperature of aggregate of carbon nanotubes. The range of combustion peak temperature ±20° C. is further preferable. When combustion temperature is low, combustion treatment time is lengthened, and when combustion temperature is high, burning time is shortened, thereby the reaction conditions can be adjusted. Therefore, the burning treatment time is not particularly limited, but attention should be paid for all necessary carbon nanotubes not to be lost. Ordinarily, it is from 5 minutes to 24 hours, preferably from 10 minutes to 12 hours, and further preferably from 30 minutes to 5 hours. Burning is preferably conducted under atmospheric pressure, and it may be conducted under oxygen/inert gas that oxygen concentration was adjusted. The oxygen concentration in this case may be suitably set to a range of 0.1% to 100% of oxygen. Further, as an inert gas, helium, nitrogen, argon and the like are used.

After oxidation treatment is conducted in a gas phase, oxidation treatment is conducted in a liquid phase. As the oxidation treatment in a liquid phase, it is done by a mixed acid (a mixture of concentrated sulfuric acid and concentrated nitric acid) treatment, or by a method of hydrogen peroxide treatment.

Treatment of aggregates of carbon nanotubes with a mixed acid of concentrated sulfuric acid and concentrated nitric acid is to react the aggregate of carbon nanotubes with a mixed compound of concentrated sulfuric acid and concentrated nitric acid. As concentrated sulfuric acid, one with a concentration of 90 to 99 weight %, preferably one with that of 95 to 98 weight % is used. As concentrated nitric acid, one with a concentration of 55 to 75 weight %, preferably one with that of 60 to 70 weight % is used. The mixing ratio of concentrated sulfuric acid and concentrated nitric acid is not particularly specified, the ratio of concentrated sulfuric acid/concentrated nitric acid is preferably set to 1/10 to 10/1. For example, there is mentioned a method that an aggregate of carbon nanotubes is mixed in a concentrated sulfuric acid/concentrated nitric acid (3/1) mixed solution for it to be 0.01 weight % to 10 weight %, and reacted at a temperature of 0 to 150° C. for 0.5 to 48 hours.

Further, after the above-described oxidation treatments, treatment with a basic compound may be conducted. By treating with a basic compound, it is thought that the mixed acid remained can be decreased, further an acidic group such as a carboxyl group that is thought to have been produced in impurities such as amorphous carbon is converted into salt and water solubility, it is thought that separation from the aggregates of carbon nanotubes becomes better. Namely, water solubility of impurities treated with a mixed acid increases, by filtration, it becomes possible to easily separate the aggregates of carbon nanotubes and impurities. The basic compound is not particularly limited, but preferable are inorganic alkali salts such as sodium hydroxide, potassium hydroxide, calcium hydroxide and sodium hydrogen carbonate; and amines such as methylamine, ethylamine, propylamine, dimethylamine, diethylamine, dipropylamine, ammonia and ammonium hydroxide.

By conducting such two kinds or more of treatments, impurities such as amorphous carbon in product can be selectively eliminated, and the purity of carbon nanotube can be improved.

These oxidation treatments may be conducted right after the synthesis of aggregates of carbon nanotubes, or may be conducted after a separate purification treatment. For example, in the case of using iron/magnesia, after oxidation treatment in a gas phase, purification treatment is conducted with acids such as hydrochloric acid to eliminate a catalyst, subsequently oxidation treatment may be conducted in a liquid phase. Further, after purification treatment with acids such as hydrochloric acid is first conducted to eliminate a catalyst, oxidation treatment in a gas phase and subsequently oxidation treatment in a liquid phase may be conducted.

The aggregate of carbon nanotubes of the present invention is useful as a field emission material. For example, when the aggregate of carbon nanotubes of the present invention is used as an electron source in field emission, the diameter is small, concentration of charge tends to take places, thus, applied voltage can be suppressed low. Further, since it is a high-quality multi-walled, particularly double-walled carbon nanotube, it is assumed that durability is also good. Due to such aggregate of carbon nanotubes, it is thought to be a good emission material.

Hereinafter, the present invention will be detailed with reference to Examples. However, the present invention is not limited to the following Examples. In Examples, various evaluations of physical properties were carried out by the following methods.

[Thermal Analysis]

About 10 mg of a sample was placed in a differential scanning calorimeter (DTG-60 manufactured by Shimadzu Corporation), raised to 900° C. from room temperature in air at a raising temperature velocity of 10° C./min. Then, combustion peak temperature due to exothermic heat was read from the DTA curve.

[Raman Spectroscopic Analysis]

A powder sample was placed in a resonant Raman spectrometer (INF-300 manufactured by Horiba Jobin Yvon S.A.S.), measurement was conducted using a laser wavelength of 532 nm. In measurement, three different places were analyzed and G/D ratio represented an arithmetic average thereof.

[X-Ray Powder Diffraction Analysis]

A powder sample was placed in an X-ray powder diffraction instrument (RINT2100 manufactured by Rigaku Corporation), analysis was conducted by operating from 1.50 to 800. X-ray source is CuKα ray. Step width is 0.0100 and measuring time is 1.0 sec.

[High-Resolution Transmission Electron Microscope Image]

One mg of aggregate of carbon nanotubes was put in 1 mL of ethanol, and subjected to dispersion treatment for about 15 minutes using an ultrasonic bath. Several drops of the sample dispersed were added on a grid, and dried. The grid that the sample was coated in this manner was placed in a transmission electron microscope (JEM-2100 manufactured by JEOL Corporation) and measurement was conducted. Measurement magnification is 50000 times to 500000 times. Acceleration voltage is 120 kV.

[Scanning Electron Microscope Image]

One mg of aggregate of carbon nanotubes was put in 1 mL of ethanol, and subjected to dispersion treatment for about 15 minutes using an ultrasonic bath. Several drops of the sample dispersed were added on a grid, and dried. The grid that the sample was coated in this manner was placed in a scanning electron microscope (JSM-6301NF manufactured by JEOL Corporation) and measurement was conducted. Measurement magnification is 1000 times to 60000 times. Acceleration voltage is 5 kV.

[Production of Transparent Conductive Film]

To a dispersion liquid of aggregates of carbon nanotubes, methanol/water was added as a wetting agent, then coated on a polyethylene terephthalate (PET) film (manufactured by Toray Industries Inc., Luminar (registered trademark) U36, light transmittance of 90.7%) using a bar coater (No. 8, coating thickness of 12 μm), dried in air, then rinsed with distilled water, and dried at 60° C. in an drier, thereby to fix the aggregate of carbon nanotubes thereon. In this time, to compare each sample easily, for matching the light transmittance of film at 85% (transparent conductive film 85%/PET film 90.7%=0.94), the number of coatings was adjusted (for one with low concentration, two-time coating, three-time coating and recoating were conducted).

[Measurement of Light Transmittance]

Regarding light transmittance, a film coated with the aggregate of carbon nanotubes was loaded in a spectrophotometer (U-2100 manufactured by Hitachi, Ltd.), and light transmittance of wavelength 550 nm was measured.

[Measurement of Surface Resistance]

Surface resistance value was measured using a 4-terminal 4-probe method according to JIS K7149, by a Loresta EPMCP-T360 (manufactured by Dia Instruments Co., Ltd.).

EXAMPLE 1

Supporting Metal Salt on Light Magnesia 5 g of iron ammonium citrate (manufactured by Wako Pure Chemical Industries Ltd.) was dissolved in 250 mL of methanol (manufactured by Kanto Chemical Co., Ltd). To this solution, 50 g of light magnesia (manufactured by Wako Pure Chemical Industries Ltd., bulk density was 0.16 g/mL) was added, treated for 60 minutes by an ultrasonic cleaner, and methanol was removed while stirring at 40° C. to 60° C., thereby to obtain a solid catalyst that metal salt was supported on light magnesia powder.

(Synthesis of Aggregate of Carbon Nanotubes)

Figure 2:
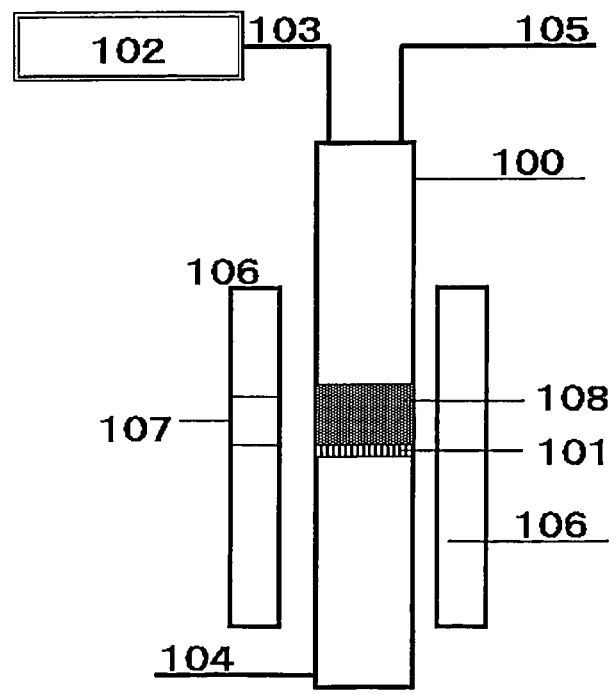
FIG. 2 is a schematic diagram of fluid bed equipment used in Examples.

An aggregate of carbon nanotubes was synthesized by a vertical fluid bed reactor shown in FIG. 2. A reactor 100 is a cylindrical quartz tube of 32 mm in inner diameter and 1200 mm in length. A quartz sintered plate 101 was equipped in the center part, an inert gas and raw gas supply line 104 is equipped in the under part of the quartz tube, and in the upper part, a waste gas line 105 and a catalyst input line 103 are equipped. Further, to keep a reactor in an arbitrary temperature, a heater 106 surrounding the periphery of the reactor is equipped. The heater 106 is provided with an inspection port 107 to be able to confirm a flow state in equipment.

Catalyst of 12 g was sampled, and the catalyst was set on the quartz sintered plate 101 through the catalyst input line 103. Next, supply of nitrogen gas was started from the gas supply line 104 at 1000 mL/min. After inside of the reactor was replaced with nitrogen gas atmosphere, temperature was raised to 900° C. (rising temperature time of 30 minutes).

After temperature reached 900° C., the temperature was kept, flow rate of nitrogen in the gas supply line 104 was increased at 2000 mL/min, fluidization of solid catalyst on the quartz sintered plate was started. After fluidization was confirmed through the inspection port 107 of heating furnace, further supply of methane was started at 95 mL/min (methane concentration of 4.5 vol %) to the reactor. After the mixed gas was supplied for 30 minutes, it was changed to flow of nitrogen alone, thereby finishing synthesis. Heating was stopped and being allowed to stand till room temperature, and after reaching room temperature, an aggregate containing the catalyst and carbons nanotubes was taken out from the reactor.

(Burning of Aggregate of Carbon Nanotubes, Purification Treatment)

Regarding the aggregate of carbon nanotubes thus obtained, as a result of thermal analysis, the combustion peak temperature was 458° C.

Further, 30 g of the aggregate of carbon nanotubes obtained in the above-described in <Synthesis of aggregate of carbon nanotubes> was sampled in a porcelain dish (150ϕ), it was raised to 450° C. over 1 hour under atmospheric pressure in a muffle furnace (FP41 manufactured by Yamato Scientific Co., Ltd.) and maintained for 60 minutes, then cooled naturally. Further, to remove the catalyst from the aggregate of carbon nanotubes, purification treatment was conducted as follows. The aggregate of carbon nanotubes obtained was added to 5N aqueous hydrochloric acid solution and stirred for one hour. A recovered material obtained by filtration using a filter of 1 μm in pore diameter was further added to 5N aqueous hydrochloric acid solution and stirred for one hour. This was filtered by using a filter of 1 μm in pore diameter, and washed with water several times, then the filtration residue was dried for 2 hours in an oven of 120° C.

Next, the purified aggregate of carbon nanotubes was added to a mixed, acid (concentrated sulfuric acid (concentration: 98 weight %)/concentrated nitric acid (concentration: 61 weight %)=3/1), stirred at 80° C. for 1 hour, then, a recovered material obtained by filtration using a filter of 1 μm in pore diameter was added to 10% aqueous propylamine solution, and stirred at room temperature for 1 hour. This was filtered by using a filter of 1 μm in pore diameter, washed with water, and a recovered material was dried overnight at 120° C., thereby to purify the aggregate of carbon nanotubes.

Regarding the aggregate of carbon nanotubes thus obtained, as a result of thermal analysis, the combustion peak temperature was 619° C.

(Resonant Raman Spectroscopic Analysis of Aggregate of Carbon Nanotubes)

Figure 3:
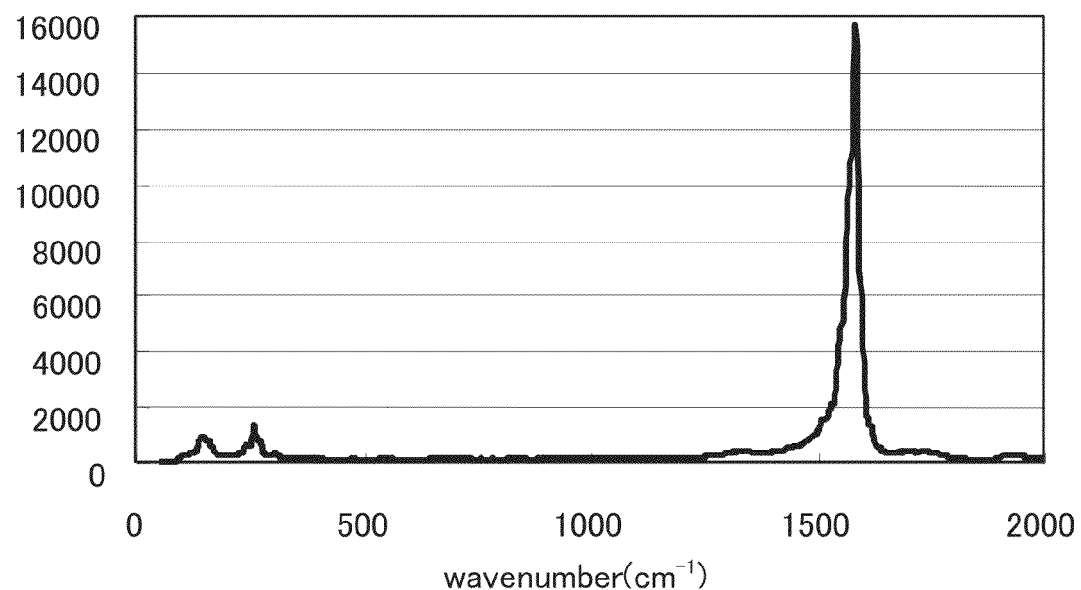
FIG. 3 is a chart of Raman spectroscopic analysis of the aggregate of carbon nanotubes obtained in Example 1.

The aggregate of carbon nanotubes thus obtained was measured for Raman scattering. As a result, in Raman spectroscopic analysis as shown in FIG. 3, it was known that G/D ratio was 58 (532 nm) showing a high-quality carbon nanotube of high degree of graphitization.

(X-Ray Powder Diffraction Analysis of Aggregate of Carbon Nanotubes)

The aggregate of carbon nanotubes thus obtained was measured for X-ray powder diffraction analysis. As a result, a peak was detected at 2θ=24.2°. Full-width at half maximum of this peak was 5.56°.

(High-Resolution Transmission Electron Microscope Analysis of Aggregate of Carbon Nanotubes)

Figure 4:
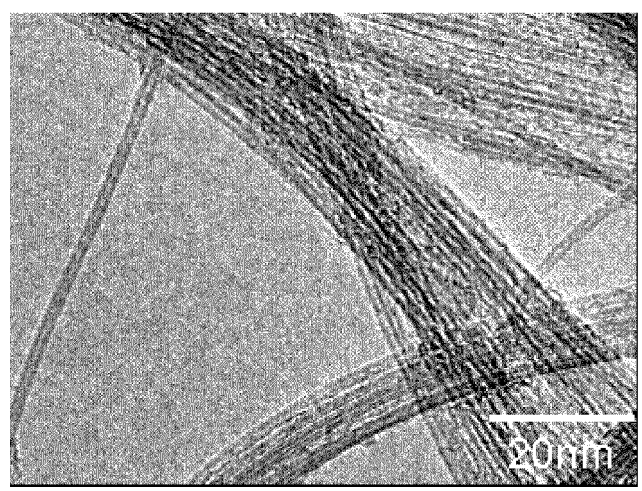
FIG. 4 is a high-resolution transmission electron microscope image of the aggregate of carbon nanotubes obtained in Example 1.

The aggregate of carbon nanotubes thus obtained was observed by a high-resolution transmission electron microscope, as a result, as shown in FIG. 4; the carbon nanotubes were constituted by beautiful graphite layers, and carbon nanotubes with 2 in the number of layers were observed. Further, of the total numbers of aggregates of carbon nanotubes (100 pieces), double-walled carbon nanotubes occupied 50 pieces. Of 100 pieces of carbon nanotubes, those with diameter of 1.5 to 2.0 nm were 90 pieces.

(Scanning Electron Microscope Analysis of Aggregate of Carbon Nanotubes)

Figure 5:
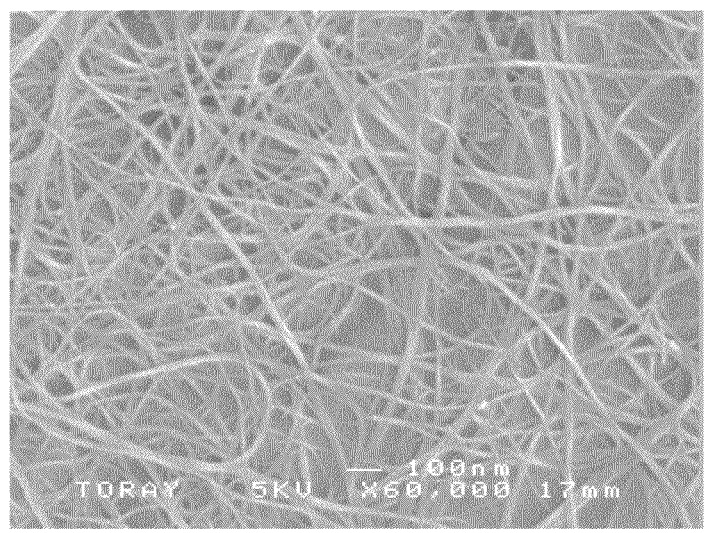
FIG. 5 is a scanning electron microscope image of the aggregate of carbon nanotubes obtained in Example 1.

FIG. 5 shows one example of images that the aggregate of carbon nanotubes thus obtained was observed by a scanning electron microscope. The average diameter of bundle was obtained by a similar observation, as a result, the average diameter was 18 nm.

(Preparation of Dispersion Liquid of Aggregate of Carbon Nanotubes)

In a container of 50 mL, 10 mg of the aggregate of carbon nanotubes and 100 mg of sodium polystyrene sulfonate aqueous solution (manufactured by Sigma-Aldrich Corporation, 30 weight %, weight average molecular weight of 200000) were sampled, 9.93 mL of distilled water was added thereto, subjected to dispersion treatment under ice cooling for 20 minutes using an ultrasonic homogenizer of output power 25 W, thereby to prepare an aggregate of carbon nanotubes liquid. No agglomerated material in the liquid prepared was confirmed by eye, and the aggregate of carbon nanotubes was well dispersed. The liquid obtained was centrifuged at 20000 G for 15 minutes using a high speed centrifugal machine, and 9 mL of supernatant was sampled. In this time, 1 mL of residual liquid was filtered using a filter of 1 μm in pore diameter, thereafter, well washed, and the filtration residue obtained was dried at 120° C. by a drier. The weight was measured to find 6.0 mg. Hence, it was known that 4.0 mg In high resistance measurement, it was measured using Hiresta UP MCP-HT450 (manufactured by Dia Instruments Co., Ltd., 10 V, 10 seconds).

(40%) of aggregate of carbon nanotubes was dispersed in 9 mL of supernatant. The supernatant concentration was 0.44 mg/mL.

(Transparent Conductive Film Containing Aggregate of Carbon Nanotubes)

To 300 μL of the dispersion liquid of aggregates of carbon nanotubes obtained above, 300 μL of methanol/water (weight ratio 1/1) was added as a wetting agent, then coated on a polyethylene terephthalate (PET) film (manufactured by Toray Industries Inc., Luminar (registered trademark) U36, light transmittance of 90.7%, 15 cm×10 cm) using a bar coater (No. 8, coating thickness of 12 μm), dried in air, then rinsed with distilled water, and dried at 60° C. in an drier for 2 minutes, thereby to fix the aggregate of carbon nanotubes thereon. The surface resistance value of the coated film obtained was $6.5 \times 10^2 \Omega/\square$, and the light transmittance was 85% (transparent conductive film 85%/PET film 90.7% 0.94), showing high electrical conductivity and transparency.

EXAMPLE 2

Supporting Metal Salt on Light Magnesia

It was conducted in the same manner as in Example 1.

(Synthesis of Aggregate of Carbon Nanotubes)

It was conducted in the same manner as in Example 1. Regarding the aggregate of carbon nanotubes obtained, thermal analysis was conducted, as a result, the combustion peak was 458° C.

(Burning of Aggregate of Carbon Nanotubes, Purification Treatment)

30 g of the aggregate of carbon nanotubes obtained was sampled in a porcelain dish (150φ), it was raised to 410° C. over 1 hour under atmospheric pressure in a muffle furnace (FP41 manufactured by Yamato Scientific Co., Ltd.) and maintained for 60 minutes, then cooled naturally. Further, to remove the catalyst from the aggregate of carbon nanotubes, purification treatment was conducted as follows. The aggregate of carbon nanotubes obtained was added to 5N aqueous hydrochloric acid solution and stirred for one hour. A recovered material obtained by filtration using a filter of 1 μm in pore diameter was further added to 5N aqueous hydrochloric acid solution and stirred for one hour. This was filtered by using a filter of 1 μm in pore diameter, and washed with water several times, then the filtration residue was dried for 2 hours in an oven of 120° C.

Next, the purified aggregate of carbon nanotubes was added to a mixed acid (concentrated sulfuric acid (concentration: 98 weight %)/concentrated nitric acid (concentration: 61 weight %)=3/1), stirred at 80° C. for 1 hour, then, a recovered material obtained by filtration using a filter of 1 μm in pore diameter was added to 10% aqueous propylamine solution, and stirred at room temperature for 1 hour. This was filtered by using a filter of 1 μm in pore diameter, washed with water, and a recovered material was dried overnight at 120° C., thereby to purify the aggregate of carbon nanotubes.

Regarding the aggregate of carbon nanotubes thus obtained, as a result of thermal analysis, the combustion peak temperature was 566° C.

(Resonant Raman Spectroscopic Analysis of Aggregate of Carbon Nanotubes)

Figure 6:
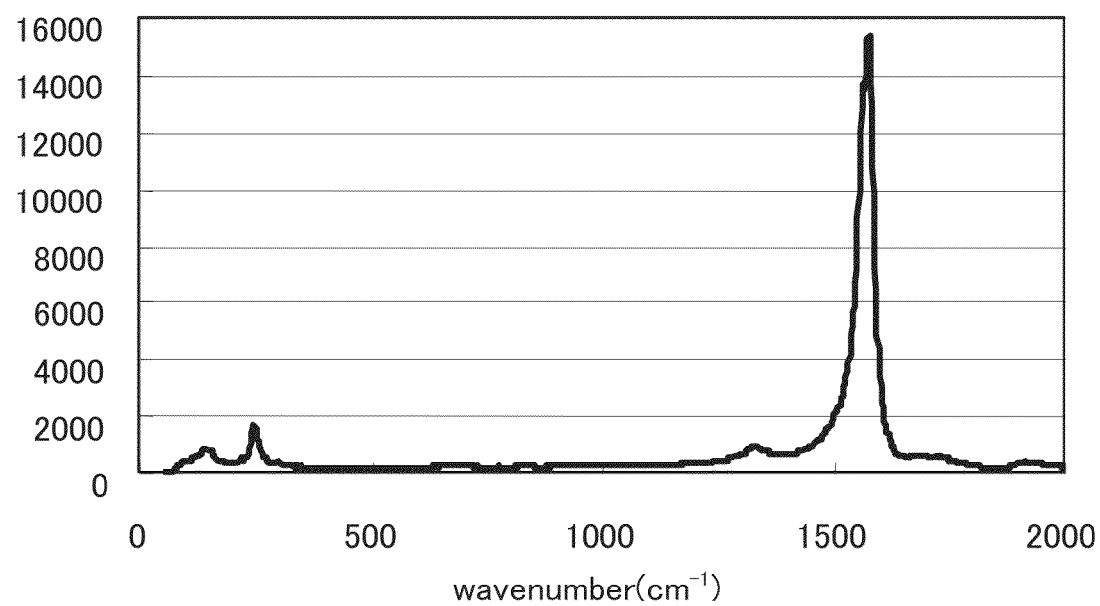
FIG. 6 is a chart of Raman spectroscopic analysis of the aggregate of carbon nanotubes obtained in Example 2.

The aggregate of carbon nanotubes thus obtained was measured for Raman scattering. As a result, in Raman spectroscopic analysis as shown in FIG. 6, it was known that G/D ratio was 32 (532 nm) showing a high-quality carbon nanotube of high degree of graphitization.

(X-Ray Powder Diffraction Analysis of Aggregate of Carbon Nanotubes)

The aggregate of carbon nanotubes thus obtained was measured for X-ray powder diffraction analysis. As a result, a peak was detected at 2θ=24.3°. Full-width at half maximum of this peak was 5.46°.

(High-Resolution Transmission Electron Microscope Analysis of Aggregate of Carbon Nanotubes)

The aggregate of carbon nanotubes thus obtained was observed by a high-resolution transmission electron microscope, as a result, the carbon nanotubes were constituted by beautiful graphite layers, and carbon nanotubes with 2 in the number of layers were observed. Further, double-walled carbon nanotubes occupied 48 pieces of the total numbers of aggregates of carbon nanotubes. Of 100 pieces of carbon nanotubes, those with diameter of 1.5 to 2.0 nm were 70 pieces.

(Scanning Electron Microscope Analysis of Aggregate of Carbon Nanotubes)

The aggregate of carbon nanotubes thus obtained was observed by a scanning electron microscope, as a result, carbon nanotubes of 19 nm in the average diameter of bundle were observed.

(Preparation of Dispersion Liquid of Aggregate of Carbon Nanotubes)

In a container of 50 mL, 10 mg of the aggregate of carbon nanotubes and 100 mg of sodium polystyrene sulfonate aqueous solution (manufactured by Sigma-Aldrich Corporation, 30 weight %, weight average molecular weight of 200000) were sampled, 9.93 mL of distilled water was added thereto, subjected to dispersion treatment under ice cooling for 20 minutes using an ultrasonic homogenizer of output power 25 W, thereby to prepare an aggregate of carbon nanotubes liquid. No agglomerated material in the liquid prepared was confirmed by eye, and the aggregate of carbon nanotubes was well dispersed. The liquid obtained was centrifuged at 20000 G for 15 minutes using a high speed centrifugal machine, and 9 mL of supernatant was sampled. In this time, 1 mL of residual liquid was filtered using a filter of 1 μm pore diameter, thereafter, well washed, and the filtration residue obtained was dried at 120° C. by a drier. The weight was measured to find 6.6 mg. Hence, it was known that 3.4 mg (34%) of aggregate of carbon nanotubes was dispersed in 9 mL of supernatant. The supernatant concentration was 0.38 mg/mL.

(Transparent Conductive Film Containing Aggregate of Carbon Nanotubes)

To 300 μL of the dispersion liquid of aggregates of carbon nanotubes obtained above, 300 μL of methanol/water (weight ratio 1/1) was added as a wetting agent, then coated on a polyethylene terephthalate (PET) film (manufactured by Toray Industries Inc., Luminar (registered trademark) U36, light transmittance of 90.7%, 15 cm×10 cm) using a bar coater (No. 8, coating thickness of 12 μm), dried in air, then rinsed with distilled water, and dried at 60° C. in an drier for 2 minutes, thereby to fix the aggregate of carbon nanotubes thereon. The surface resistance value of the coated film obtained was $1.2 \times 10^3 \Omega/\square$, and the light transmittance was 85% (transparent conductive film 85%/PET film 90.7%=0.94), showing high electrical conductivity and transparency.

EXAMPLE 3

Supporting Metal Salt on Light Magnesia

The same manner as in Example 1.
(Synthesis of Aggregate of Carbon Nanotubes and Burning)

The same vertical fluid bed reactor as in Example 1 was used.

Catalyst of 12 g was sampled, and the catalyst was set on the quartz sintered plate 101 through the catalyst input line 103. Next, supply of nitrogen gas was started from the gas supply line 104 at 1000 mL/min. After inside of the reactor was replaced with nitrogen gas atmosphere, temperature was raised to 900° C. (rising temperature time of 30 minutes).

After temperature reached 900° C., the temperature was kept, flow rate of argon in the gas supply line 104 was increased at 2000 mL/min, fluidization of solid catalyst on the quartz sintered plate was started. After fluidization was confirmed through the inspection port 107 of heating furnace, further supply of methane was started at 95 mL/min (methane concentration of 4.5 vol %) to the reactor. After the mixed gas was supplied for 30 minutes, it was changed to flow of nitrogen alone, thereby finishing synthesis.

Thereafter, while flowing nitrogen gas, heating was not stopped, air (15 L) was supplied intermittently over 15 minutes (1 L per 1 time), thereby to conduct burning. Thereafter, while flowing nitrogen gas, being allowed to stand till room temperature, and after reaching room temperature, an aggregate containing the catalyst and carbon nanotubes was taken out from the reactor.

(Purification Treatment of Aggregate of Carbon Nanotubes)

To remove the catalyst from the aggregate of carbon nanotubes, purification treatment was conducted as follows. The aggregate of carbon nanotubes obtained was added to 5N aqueous hydrochloric acid solution and stirred at 80° C. for one hour in a water bath This was filtered by using a filter of 1 μm in pore diameter, and washed with water several times, then the filtration residue was dried for 2 hours in an oven of 120° C.

Next, the purified aggregate of carbon nanotubes was added to a mixed acid (concentrated sulfuric acid (concentration: 98 weight %)/concentrated nitric acid (concentration: 61 weight %)=3/1), stirred at 80° C. for 1 hour, then, a recovered material obtained by filtration using a filter of 1 μm in pore diameter was added to 10% aqueous propylamine solution, and stirred at room temperature for 1 hour. This was filtered by using a filter of 1 μm in pore diameter, washed with water, and a recovered material was dried overnight at 120° C., thereby to purify the aggregate of carbon nanotubes.

Regarding the aggregate of carbon nanotubes thus obtained, as a result of thermal analysis, the combustion peak temperature was 636° C.

(Resonant Raman Spectroscopic Analysis of Aggregate of Carbon Nanotubes)

Figure 7:
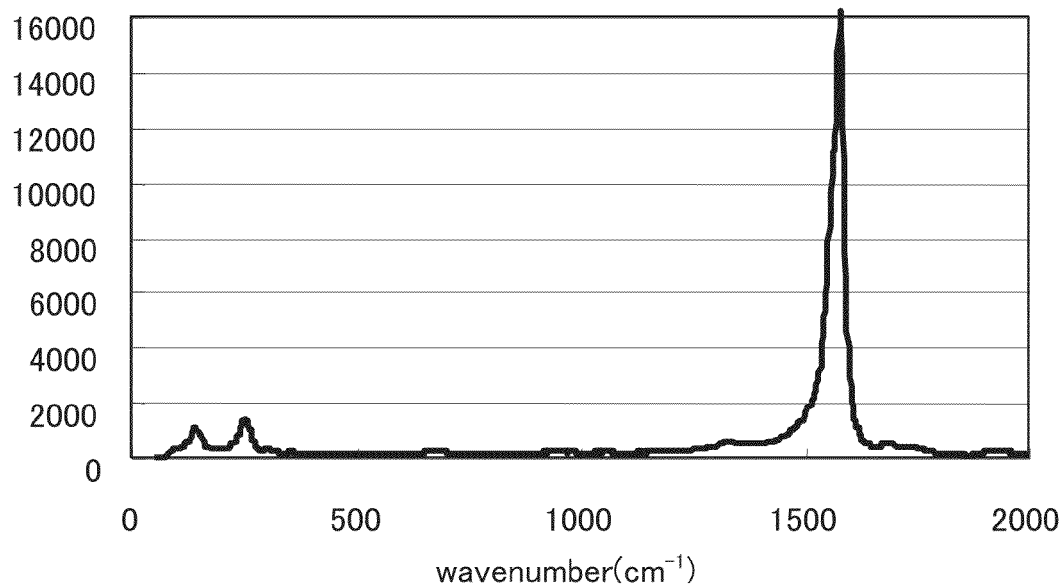
FIG. 7 is a chart of Raman spectroscopic analysis of the aggregate of carbon nanotubes obtained in Example 3.

The aggregate of carbon nanotubes thus obtained was measured for Raman scattering. As a result, in Raman spectroscopic analysis as shown in FIG. 7, it was known that G/D ratio was 50 (532 nm) showing a high-quality carbon nanotube of high degree of graphitization.

(X-Ray Powder Diffraction Analysis of Aggregate of Carbon Nanotubes)

The aggregate of carbon nanotubes thus obtained was measured for X-ray powder diffraction analysis. As a result, a peak was detected at 2θ=24.0°. Full-width at half maximum of this peak was 5.79°.

(High-Resolution Transmission Electron Microscope Analysis of Aggregate of Carbon Nanotubes)

The aggregate of carbon nanotubes thus obtained was observed by a high-resolution transmission electron microscope, as a result, the carbon nanotubes were constituted by beautiful graphite layers, and carbon nanotubes with 2 in the number of layers were observed. Further, double-walled carbon nanotubes occupied 50% or more (51 pieces) of the total numbers of aggregates of carbon nanotubes. Of 100 pieces of carbon nanotubes, those with diameter of 1.5 to 2.0 nm were 70 pieces.

(Scanning Electron Microscope Analysis of Aggregate of Carbon Nanotubes)

Figure 8:
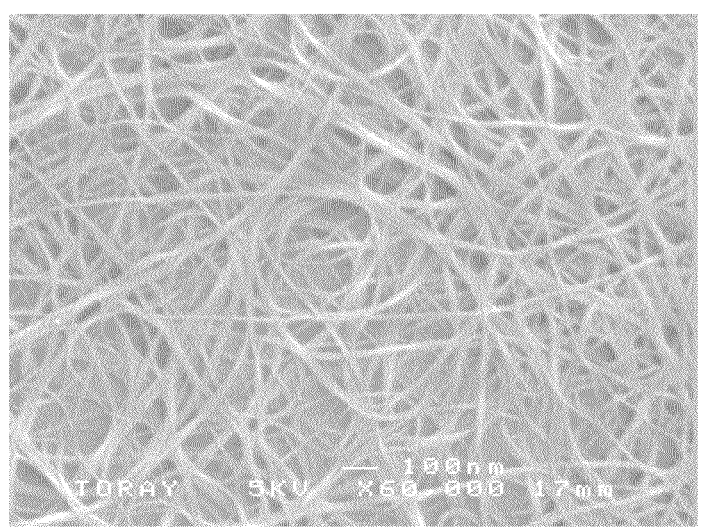
FIG. 8 is a scanning electron microscope image of the aggregate of carbon nanotubes obtained in Example 3.

FIG. 8 shows one example of images that the aggregate of carbon nanotubes thus obtained was observed by a scanning electron microscope, the average diameter of bundle was obtained by a similar observation, as a result, the average diameter was 19 nm.

(Preparation of Dispersion Liquid of Aggregate of Carbon Nanotubes)

In a container of 50 mL, 10 mg of the aggregate of carbon nanotubes and 100 mg of sodium polystyrene sulfonate aqueous solution (manufactured by Sigma-Aldrich Corporation, 30 weight %, weight average molecular weight of 200000) were sampled, 9.93 mL of distilled water was added thereto, subjected to dispersion treatment under ice cooling for 20 minutes using an ultrasonic homogenizer of output power 25 W, thereby to prepare an aggregate of carbon nanotubes liquid. No agglomerated material in the liquid prepared was confirmed by eye, and the aggregate of carbon nanotubes was well dispersed. The liquid obtained was centrifuged at 20000 G for 15 minutes using a high speed centrifugal machine, and 9 mL of supernatant was sampled and stored in a sample tube. In this time, 1 mL of residual liquid was filtered using a filter of 1 μm in pore diameter, thereafter, well washed, and the filtration residue obtained was dried at 120° C. by a drier. The weight was measured to find 5.8 mg. Hence, it was known that 4.2 mg (42%) of aggregate of carbon nanotubes was dispersed in 9 mL of supernatant. The supernatant concentration was 0.47 mg/mL.

(Transparent Conductive Film Containing Aggregate of Carbon Nanotubes)

To 300 μL of the dispersion liquid of aggregates of carbon nanotubes obtained above, 300 μL of methanol/water (weight ratio 1/1) was added as a wetting agent, then coated on a polyethylene terephthalate (PET) film (manufactured by Toray Industries Inc., Luminar (registered trademark) U36, light transmittance of 90.7%, 15 cm×10 cm) using a bar coater (No. 8, coating thickness of 12 μm), dried in air, then rinsed with distilled water, and dried at 60° C. in an drier for 2 minutes, thereby to fix the aggregate of carbon nanotubes thereon. The surface resistance value of the coated film obtained was $7.0 \times 10^2 \Omega/\square$, and the light transmittance was 85% (transparent conductive film 85%/PET film 90.7%=0.94), showing high electrical conductivity and transparency.

EXAMPLE 4

Production of Field Electron Emission Source

In a beaker of 100 mL, 50 mg of the aggregate of carbon nanotubes obtained in Example 1 that the catalyst was removed (aggregate of carbon nanotubes after burning and purification treatment) and 100 mL of acetone were put, and irradiated by ultrasonic waves for 30 minutes. The present dispersion liquid was put in another beaker in which a copper plate was put, left still for acetone to evaporate naturally, thereby to obtain a copper plate that carbon nanotubes were deposited on the surface.

Evaluation of Field Electron Emission Capability

The copper plate obtained can be used as a cathode of a field emission device. The copper plate that carbon nanotubes were deposited on the surface is set as a cathode, and other copper plate is set as an anode electrode, which are disposed facing each other. This diode structural object is introduced to a chamber for evaluation, and field electron emission capability can be evaluated. The carbon nanotubes obtained in the present Example can be expected to show a good electron emission capability.

COMPARATIVE EXAMPLE 1

Analysis of Carbon Nanotube

Raman G/D ratio (532 nm) of double-walled carbon nanotubes manufactured by Nanotechport Company was 14, and a peak was observed at 24.6° by X-ray powder diffraction analysis, and the combustion peak temperature was 498° C.

(Preparation of Dispersion Liquid of Carbon Nanotubes)

In a container of 50 mL, 10 mg of double-walled carbon nanotubes manufactured by Nanotechport Company and 100 mg of sodium polystyrene sulfonate aqueous solution (manufactured by Sigma-Aldrich Corporation, 30 weight %, weight average molecular weight of 200000) were sampled, 9.93 mL of distilled water was added thereto, subjected to dispersion treatment under ice cooling for 20 minutes using an ultrasonic homogenizer of output power 25 W, thereby to prepare an aggregate of carbon nanotubes liquid. The liquid obtained was centrifuged at 20000 G for 15 minutes using a high speed centrifugal machine, and 9 mL of supernatant was sampled. The deposit in this time was filtered using a filter of 1 μm in pore diameter, washed with water, dried and the weight was measured to find 8.1 mg. Hence, it was known that 1.9 mg (19%) of aggregate of carbon nanotubes was dispersed in 9 mL of supernatant. The supernatant concentration was 0.21 mg/mL.

(Transparent Conductive Film Containing Carbon Nanotubes)

To 300 μL of the dispersion liquid of carbon nanotubes obtained above, 300 μL of methanol/water (weight ratio 1/1) was added as a wetting agent, then coated on a polyethylene terephthalate (PET) film (manufactured by Toray Industries Inc., Luminar (registered trademark) U36, light transmittance of 90.7%, 15 cm×10 cm) using a bar coater (No. 8, coating thickness of 12 μm), dried in air, then rinsed with distilled water, and 15 cm×10 cm film was dried at 60° C. in an drier, thereby to fix the carbon nanotubes thereon. The surface resistance value of the coated film obtained was $2.8 \times 10^9 \Omega/\square$, and the light transmittance was 90.4% (transparent conductive film 90.4%/PET film 90.7%=0.99).

Further, for the film that carbon nanotubes were fixed in the same manner as described above, further the above coating operation was repeated two times in total. The surface resistance value of the coated film obtained was $1.0 \times 10^7 \Omega/\square$, and the light transmittance was 85% (transparent conductive film 85%/PET film 90.7%=0.94).

COMPARATIVE EXAMPLE 2

Analysis of Carbon Nanotube

Raman G/D ratio (532 nm) of double-walled carbon nanotubes manufactured by Nanocyl Company was 9, and a peak was observed at 24.3° by X-ray powder diffraction analysis, and the combustion peak temperature was 504° C.

(Preparation of Dispersion Liquid of Carbon Nanotubes)

In a container of 50 mL, 10 mg of double-walled carbon nanotubes manufactured by Nanocyl Company and 100 mg of sodium polystyrene sulfonate aqueous solution (manufactured by Sigma-Aldrich Corporation, 30 weight %, weight average molecular weight of 200000) were sampled, 9.93 mL of distilled water was added thereto, subjected to dispersion treatment under ice cooling for 20 minutes using an ultrasonic homogenizer of output power 25 W, thereby to prepare an aggregate of carbon nanotubes liquid. The liquid obtained was centrifuged at 20000 G for 15 minutes using a high speed centrifugal machine, and 9 mL of supernatant was sampled. The deposit in this time was filtered using a filter of 1 μm in pore diameter, washed with water, dried and the weight was measured to find 8.3 mg. Hence, it was known that 1.7 mg (17%) of aggregate of carbon nanotubes was dispersed in 9 mL of supernatant. The supernatant concentration was 0.19 mg/mL.

(Transparent Conductive Film Containing Carbon Nanotubes)

To 300 μL of the dispersion liquid of carbon nanotubes obtained above, 300 μL of methanol/water (weight ratio 1/1) was added as a wetting agent, then coated on a polyethylene terephthalate (PET) film (manufactured by Toray Industries Inc., Luminar (registered trademark) U36, light transmittance of 90.7%, 15 cm×10 cm) using a bar coater (No. 8, coating thickness of 12 μm), dried in air, then rinsed with distilled water, and dried at 60° C. in an drier for 2 minutes, thereby to fix the carbon nanotubes thereon. The surface resistance value of the coated film obtained was $7.8 \times 10^6 \Omega/\square$, and the light transmittance was 90.1% (transparent conductive film 90.1%/PET film 90.7%=0.99).

Further, for the film that carbon nanotubes were fixed in the same manner as described above, further the above coating operation was repeated three times in total. The surface resistance value of the coated film obtained was $1.0 \times 10^6 \Omega/\square$, and the light transmittance was 85% (transparent conductive film 85%/PET film 90.7%=0.94).

COMPARATIVE EXAMPLE 3

Analysis of Carbon Nanotube

Raman G/D ratio (532 nm) of single-walled carbon nanotubes manufactured by Nanotechport Company was 4, and a peak was observed at 24.9° by X-ray powder diffraction analysis, and the combustion peak temperature was 564° C.

(Preparation of Dispersion Liquid of Carbon Nanotubes)

In a container of 50 mL, 10 mg of single-walled carbon nanotubes manufactured by Nanotechport Company and 100 mg of sodium polystyrene sulfonate aqueous solution (manufactured by Sigma-Aldrich Corporation, 30 weight %, weight average molecular weight of 200000) were sampled, 9.93 mL of distilled water was added thereto, subjected to dispersion treatment under ice cooling for 20 minutes using an ultrasonic homogenizer of output power 25 W, thereby to prepare an aggregate of carbon nanotubes liquid. The liquid obtained was centrifuged at 20000 G for 15 minutes using a high speed centrifugal machine, and 9 mL of supernatant was sampled. The deposit in this time was filtered using a filter of 1 μm in pore diameter, washed with water, dried and the weight was measured to find 8.0 mg. Hence, it was known that 2.0 mg (20%) of aggregate of carbon nanotubes was dispersed in 9 mL of supernatant. The supernatant concentration was 0.22 mg/mL.

(Transparent Conductive Film Containing Carbon Nanotubes)

To 300 μL of the dispersion liquid of carbon nanotubes obtained above, 300 μL of methanol/water (weight ratio 1/1) was added as a wetting agent, then coated on a polyethylene terephthalate (PET) film (manufactured by Toray Industries Inc., Luminar (registered trademark) U36, light transmittance of 90.7%, 15 cm×10 cm) using a bar coater (No. 8, coating thickness of 12 μm), dried in air, then rinsed with distilled water, and dried at 60° C. in an drier for 2 minutes, thereby to fix the carbon nanotubes thereon. The above coating operation was repeated two times in total. The surface resistance value of the coated film obtained was $1.0 \times 10^5 \Omega/\square$, and the light transmittance was 85% (transparent conductive film 85%/PET film 90.7%=0.94).

COMPARATIVE EXAMPLE 4

Analysis of Carbon Nanotube

Raman G/D ratio (532 nm) of single-walled carbon nanotubes manufactured by Nanocyl Company was 8, and a peak was observed at 23.9° by X-ray powder diffraction analysis, and the combustion peak temperature was 520° C.

(Preparation of Dispersion Liquid of Carbon Nanotubes)

In a container of 50 mL, 10 mg of single-walled carbon nanotubes manufactured by Nanocyl Company and 100 mg of sodium polystyrene sulfonate aqueous solution (manufactured by Sigma-Aldrich Corporation, 30 weight %, weight average molecular weight of 200000) were sampled, 9.93 mL of distilled water was added thereto, subjected to dispersion treatment under ice cooling for 20 minutes using an ultrasonic homogenizer of output power 25 W, thereby to prepare an aggregate of carbon nanotubes liquid. The liquid obtained was centrifuged at 20000 G for 15 minutes using a high speed centrifugal machine, and 9 mL of supernatant was sampled. The deposit in this time was filtered using a filter of 1 μm in pore diameter, washed with water, dried and the weight was measured to find 8.1 mg. Hence, it was known that 1.9 mg (19%) of aggregate of carbon nanotubes was dispersed in 9 mL of supernatant. The supernatant concentration was 0.21 mg/mL.

(Transparent Conductive Film Containing Carbon Nanotubes)

To 300 μL of the dispersion liquid of carbon nanotubes obtained above, 300 μL of methanol/water (weight ratio 1/1) was added as a wetting agent, then coated on a polyethylene terephthalate (PET) film (manufactured by Toray Industries Inc., Luminar (registered trademark) U36, light transmittance of 90.7%, 15 cm×10 cm) using a bar coater (No. 8, coating thickness of 12 μm), dried in air, then rinsed with distilled water, and 15 cm×10 cm film was dried at 60° C. in an drier, thereby to fix the carbon nanotubes thereon. The above coating operation was repeated two times in total. The surface resistance value of the coated film obtained was $4.7 \times 10^7 \Omega/\square$, and the light transmittance was 85% (transparent conductive film 85%/PET film 90.7%=0.94).

COMPARATIVE EXAMPLE 5

Analysis of Carbon Nanotube

Raman G/D ratio (532 nm) of multi-walled carbon nanotubes (Baytube) manufactured by Bayer Corporation was 0.7, and a peak was observed at 25.3° by X-ray powder diffraction analysis, and the combustion peak temperature was 544° C.

(Preparation of Dispersion Liquid of Carbon Nanotubes)

In a container of 50 mL, 10 mg of multi-walled carbon nanotubes (Baytube) manufactured by Bayer Corporation and 100 mg of sodium polystyrene sulfonate aqueous solution (manufactured by Sigma-Aldrich Corporation, 30 weight %, weight average molecular weight of 200000) were sampled, 9.93 mL of distilled water was added thereto, subjected to dispersion treatment under ice cooling for 20 minutes using an ultrasonic homogenizer of output power 25 W, thereby to prepare an aggregate of carbon nanotubes liquid. The liquid obtained was centrifuged at 20000 G for 15 minutes using a high speed centrifugal machine, and 9 mL of supernatant was sampled. The deposit in this time was filtered using a filter of 1 μm in pore diameter, washed with water, dried and the weight was measured to find 6.3 mg. Hence, it was known that 3.7 mg (37%) of aggregate of carbon nanotubes was dispersed in 9 mL of supernatant. The supernatant concentration was 0.41 mg/mL.

(Transparent Conductive Film Containing Carbon Nanotubes)

To 300 μL of the dispersion liquid of carbon nanotubes obtained above, 300 μL of methanol/water (weight ratio 1/1) was added as a wetting agent, then coated on a polyethylene terephthalate (PET) film (manufactured by Toray Industries Inc., Luminar (registered trademark) U36, light transmittance of 90.7%, 15 cm×10 cm) using a bar coater (No. 8, coating thickness of 12 μm), dried in air, then rinsed with distilled water, and was dried at 60° C. in an drier for 2 minutes, thereby to fix the carbon nanotubes thereon. The surface resistance value of the coated film obtained was $>1 \times 10^{12} \Omega/\square$, and the light transmittance was 85% (transparent conductive film 85%/PET film 90.7%=0.94).

TABLE 1

|  | Raman G/D ratio | XRD(2θ) | Combustion peak | Supernatant concentration (mg/mL) | Transparent electrical conductivity (surface resistance value at 85% light transmittance) |
|---|---|---|---|---|---|
| Example 1 | 58 | 24.2° | 619° C. | 0.44 | $6.5 \times 10^2\ \Omega/\square$ |
| Example 2 | 32 | 24.3° | 566° C. | 0.38 | $1.2 \times 10^3\ \Omega/\square$ |
| Example 3 | 50 | 24.0° | 636° C. | 0.47 | $7.0 \times 10^2\ \Omega/\square$ |
| Comparative Example 1 | 14 | 24.6° | 498° C. | 0.21 | $1.0 \times 10^7\ \Omega/\square$ |
| Comparative Example 2 | 9 | 24.3° | 504° C. | 0.19 | $1.0 \times 10^6\ \Omega/\square$ |
| Comparative Example 3 | 4 | 24.9° | 564° C. | 0.22 | $1.0 \times 10^5\ \Omega/\square$ |

TABLE 1-continued

|  | Raman G/D ratio | XRD(2θ) | Combustion peak | Supernatant concentration (mg/mL) | Transparent electrical conductivity (surface resistance value at 85% light transmittance) |
|---|---|---|---|---|---|
| Comparative Example 4 | 8 | 23.9° | 520° C. | 0.21 | $4.3 \times 10^7$ Ω/□ |
| Comparative Example 5 | 0.7 | 25.3° | 544° C. | 0.37 | $>1.0 \times 10^{12}$ Ω/□ |

INDUSTRIAL APPLICABILITY

According to the present invention, it became possible to obtain an aggregate of carbon nanotubes capable of exhibiting inherent characteristics of carbon nanotube with better dispersibility than the conventional one regardless of high quality, and having excellent light transmittance and surface resistance by producing carbon nanotubes with a small bundle containing multilayer while high quality. In particular, by producing this in an aggregate of double-walled carbon nanotubes, it became possible to obtain carbon nanotubes having a small diameter and excellent dispersibility. Further, by producing a dispersion using the aggregate of carbon nanotubes of the present invention, it became possible to obtain a dispersion of carbon nanotubes having good dispersibility. Further, by coating this, a conductive film with high electrical conductivity and excellent transparency, and an emission material with excellent electron emission characteristic are obtained.

What is claimed is:

1. An aggregate of carbon nanotubes comprising bundles of carbon nanotubes, wherein the carbon nanotubes comprise multilayer carbon nanotubes, wherein an average in bundle diameter of bundles formed by the carbon nanotubes in the aggregate and observed by a scanning electron microscope is 20 nm or less, and wherein the aggregate of carbon nanotubes satisfies the following conditions (1) to (4):
    (1) there is a 2θ peak at 24°±2° by X-ray powder diffraction analysis;
    (2) a height ratio (G/D ratio) of G band to D band by Raman spectroscopic analysis of wavelength 532 nm is 30 or more;
    (3) a combustion peak temperature is from 550° C. to 650° C.; and
    (4) when a mixture of 10 mg of the aggregate of carbon nanotubes, 30 mg of sodium polystyrene sulfonate and 10 mL of water is subjected to ultrasonic homogenizer treatment under ice cooling for 20 minutes using an ultrasonic homogenizer at output of 25 W and subsequently subjected to centrifugal treatment at 20000 G for 15 minutes by a centrifugal separator, and then 9 mL of supernatant is sampled, a content of the aggregate of carbon nanotubes in said supernatant is 0.3 mg/mL or more.

2. The aggregate of carbon nanotubes of claim 1, wherein 50 or more of 100 carbon nanotubes in the aggregate of carbon nanotubes that are observed by a transmission electron microscope have an outer diameter in the range of 1.5 to 2.0 nm.

3. A dispersion where the aggregate of carbon nanotubes of claim 1 is dispersed in a solvent.

4. The dispersion of the aggregate of carbon nanotubes of claim 3, comprising at least one kind selected from a surfactant, a conductive polymer and a nonconductive polymer.

5. The dispersion of the aggregate of carbon nanotubes of claim 3, wherein the concentration of aggregate of carbon nanotubes is from 0.01 weight % to 20 weight %.

6. A conductive film where a conductive layer containing the aggregate of carbon nanotubes of claim 1 is formed on a substrate.

7. The conductive film of claim 6, wherein surface resistance is less than $1 \times 10^4$ Ω/□, and light transmittance of wavelength 550 nm satisfies the following condition:

light transmittance of the conductive film/light transmittance of the transparent substrate>0.85.

8. A method for producing the aggregate of carbon nanotubes of claim 1, comprising: a step that in a vertical fluid bed reactor, a fluid bed is formed by a powdery catalyst supporting iron on magnesia over the whole area in a horizontal cross section direction of the reactor, by flowing methane in a vertical direction inside the reactor, methane is contacted with the catalyst at 500 to 1200° C. to produce an aggregate of carbon nanotubes, and a step that the aggregate of carbon nanotubes obtained is subjected to oxidation treatment in a gas phase, then further subjected to oxidation treatment in a liquid phase.

9. The method for producing the aggregate of carbon nanotubes of claim 8, wherein said oxidation treatment in a gas phase is a burning treatment conducted in a range of combustion peak temperature ±50° C. of the aggregate of carbon nanotubes.

10. The method for producing the aggregate of carbon nanotubes of claim 8, wherein said oxidation treatment in a gas phase is an intermittent contact with oxygen.

11. The method for producing the aggregate of carbon nanotubes of claim 8, wherein said oxidation treatment in a liquid phase is a mixed acid treatment.

12. The method for producing the aggregate of carbon nanotubes of claim 8, wherein said oxidation treatment in a gas phase is contact with oxygen at 400° C. to 900° C., and said oxidation treatment in a liquid phase is a mixed acid treatment.

13. The method for producing the aggregate of carbon nanotubes of claim 8, wherein further treatment with a basic compound is conducted after said oxidation treatment in a liquid phase.

* * * * *